(12) United States Patent
Dean

(10) Patent No.: US 6,736,037 B2
(45) Date of Patent: May 18, 2004

(54) COPING SAW

(76) Inventor: Ethan Dean, 9779 Fairway Dr., Pinckney, MI (US) 48169

( * ) Notice: Subject to any disclaimer, the term of this patent is extended or adjusted under 35 U.S.C. 154(b) by 0 days.

(21) Appl. No.: 09/800,001

(22) Filed: Mar. 6, 2001

(65) Prior Publication Data

US 2003/0188440 A1 Oct. 9, 2003

Related U.S. Application Data

(63) Continuation-in-part of application No. 09/531,923, filed on Mar. 21, 2000
(60) Provisional application No. 60/125,662, filed on Mar. 22, 1999.

(51) Int. Cl.[7] .................................................. B25G 1/06
(52) U.S. Cl. .............................. 83/13; 83/792; 30/380; 30/509; 30/519
(58) Field of Search ........................ 30/380, 509, 513, 30/519, 517; 83/13, 792, 818, 788; 451/355, 523, 524, 525; 144/363, 360, 359

(56) References Cited

U.S. PATENT DOCUMENTS

| | | | | |
|---|---|---|---|---|
| 1,374,638 A | * | 4/1921 | Cew et al. ................. | 30/272.1 |
| 1,453,335 A | * | 5/1923 | Bennett ..................... | 30/380 |
| 2,596,081 A | * | 5/1952 | Sacrey ...................... | 30/380 |
| 2,604,910 A | * | 7/1952 | Crosby ...................... | 30/380 |
| 3,155,128 A | * | 11/1964 | Godfrey et al. ............ | 30/340 |
| 3,829,970 A | * | 8/1974 | Anderson .................. | 30/274 |
| 4,001,937 A | * | 1/1977 | Stelljes et al. ............. | 30/380 |
| 4,413,414 A | * | 11/1983 | Strzalka .................... | 30/380 |
| 4,711,032 A | * | 12/1987 | Rickmers et al. .......... | 30/372 |
| 4,953,295 A | * | 9/1990 | Barradas et al. ........... | 30/380 |
| 4,974,325 A | * | 12/1990 | Hartlein .................... | 30/383 |
| 5,388,334 A | * | 2/1995 | Halsey ...................... | 30/123 |
| 5,965,045 A | * | 10/1999 | Zigliotto ................ | 219/137.31 |
| 6,155,916 A | * | 12/2000 | Rudolf et al. ............. | 451/344 |
| 6,442,848 B1 | * | 9/2002 | Dean ........................ | 30/380 |

* cited by examiner

Primary Examiner—Allan N. Shoap
Assistant Examiner—Thomas J Druan, Jr
(74) Attorney, Agent, or Firm—Miller, Johnson, Snell & Cummiskey, P.L.C.

(57) ABSTRACT

A coping saw is provided having two spaced-apart rotary actuators supported by a frame. Two saw-blade sections extend between the two rotary actuators and are intended to singularly engage a work piece. The saw is adapted to contain a drive mechanism which is coupled to a first of the two rotary actuators for causing the saw-blade sections to move in at least one direction. At least one guide roller assembly is disposed each of the two saw-blade sections for providing stability and retaining said two-saw blade sections between said two rotary actuators.

6 Claims, 18 Drawing Sheets

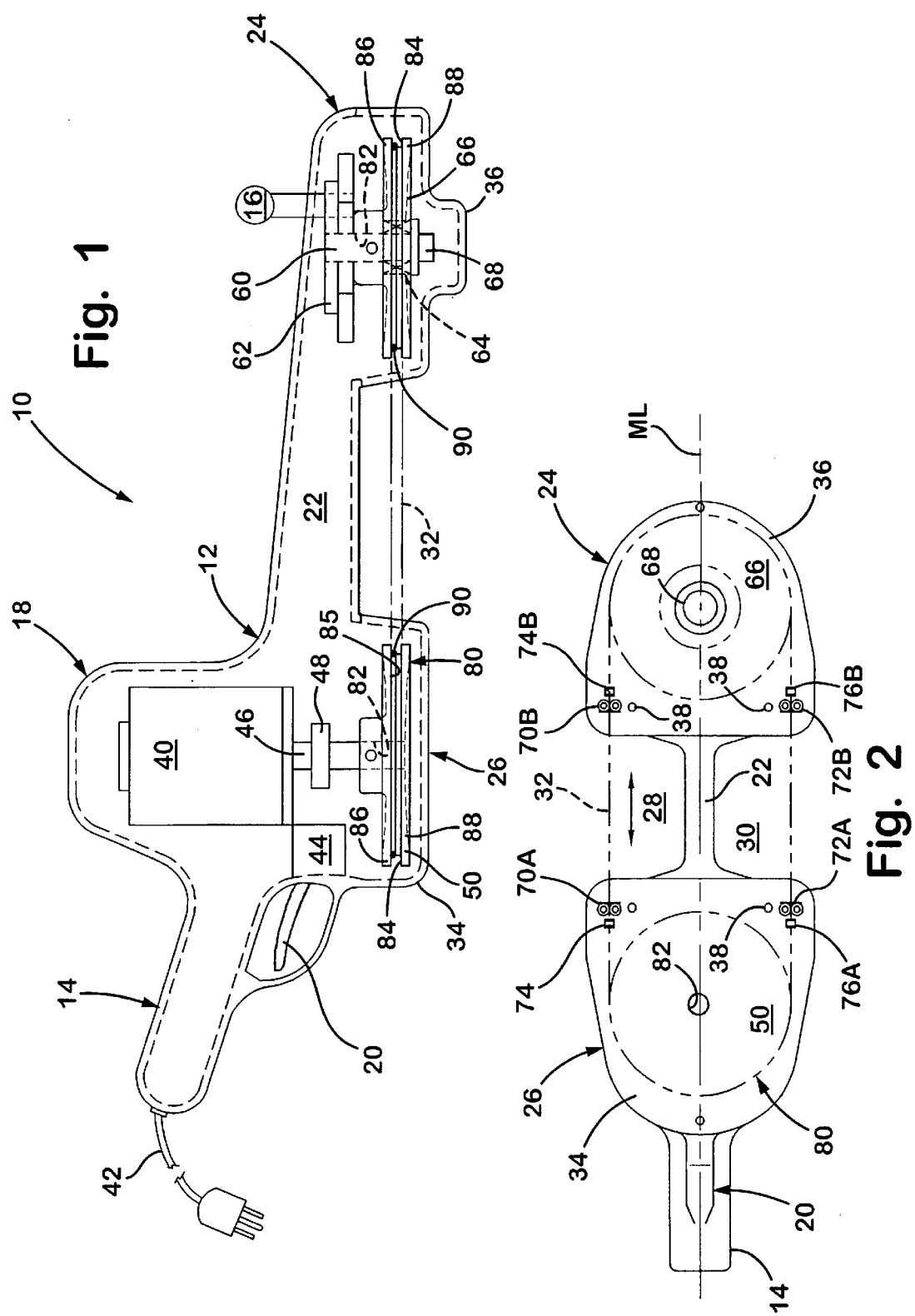

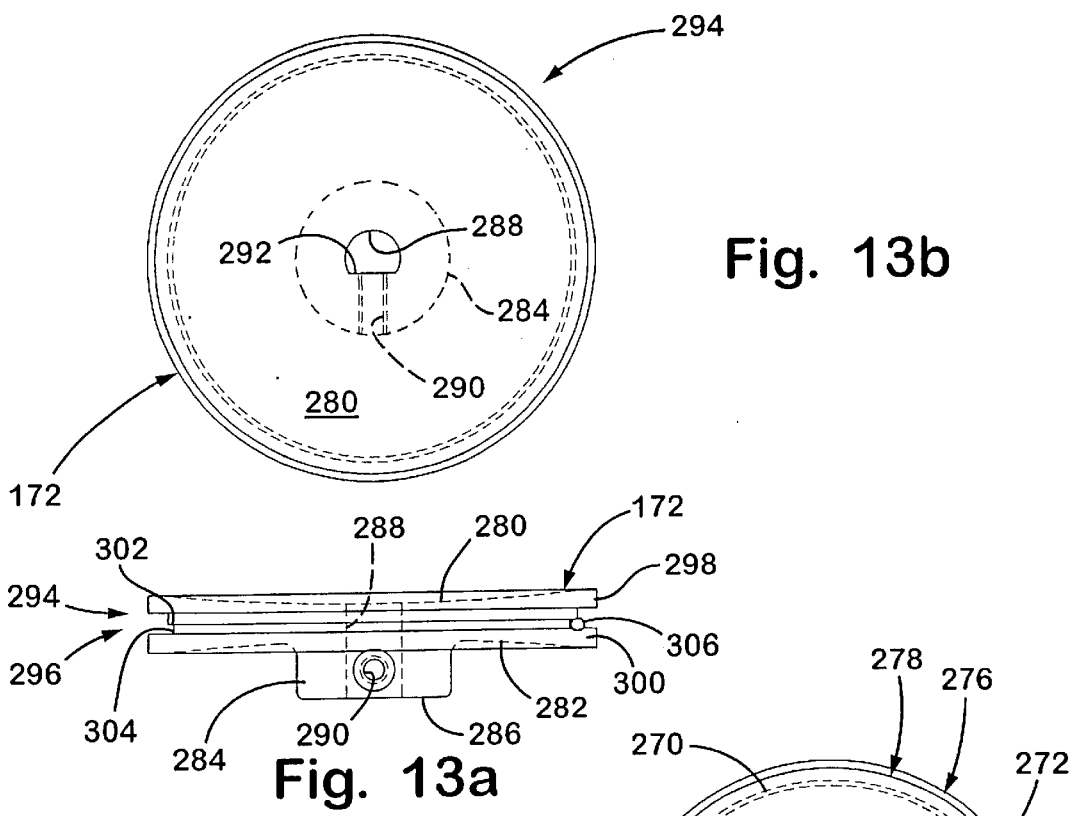
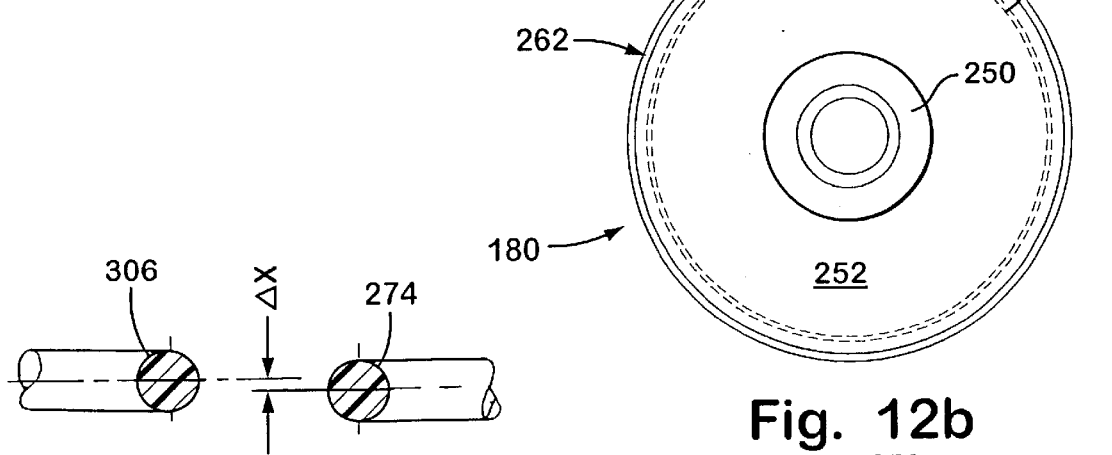
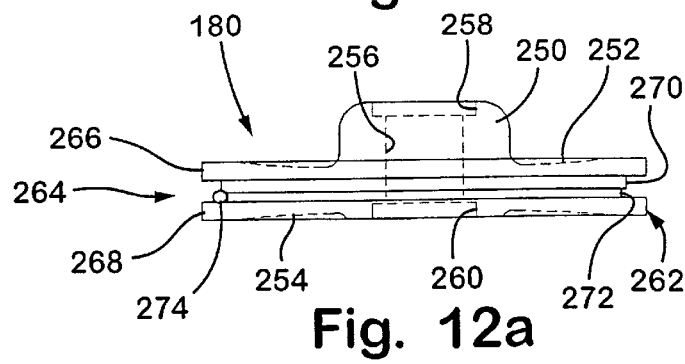
Fig. 13b
Fig. 13a
Fig. 12b
Fig. 12a
Fig. 14

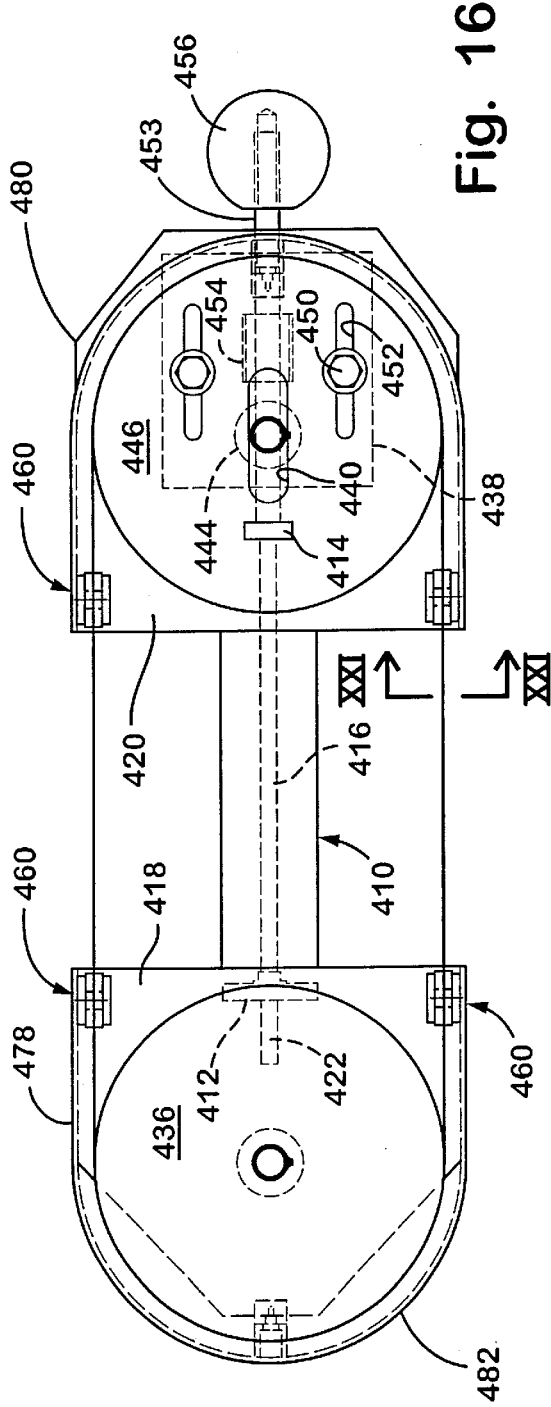
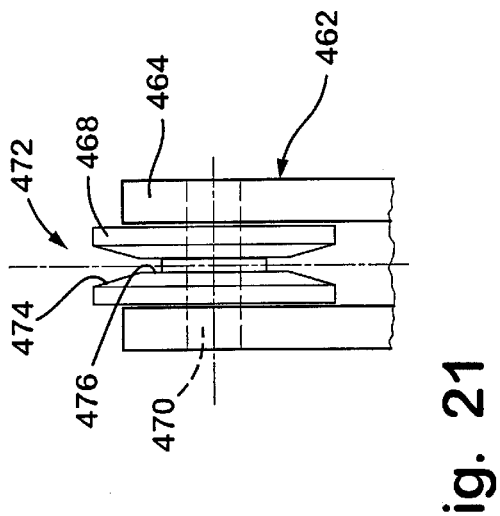
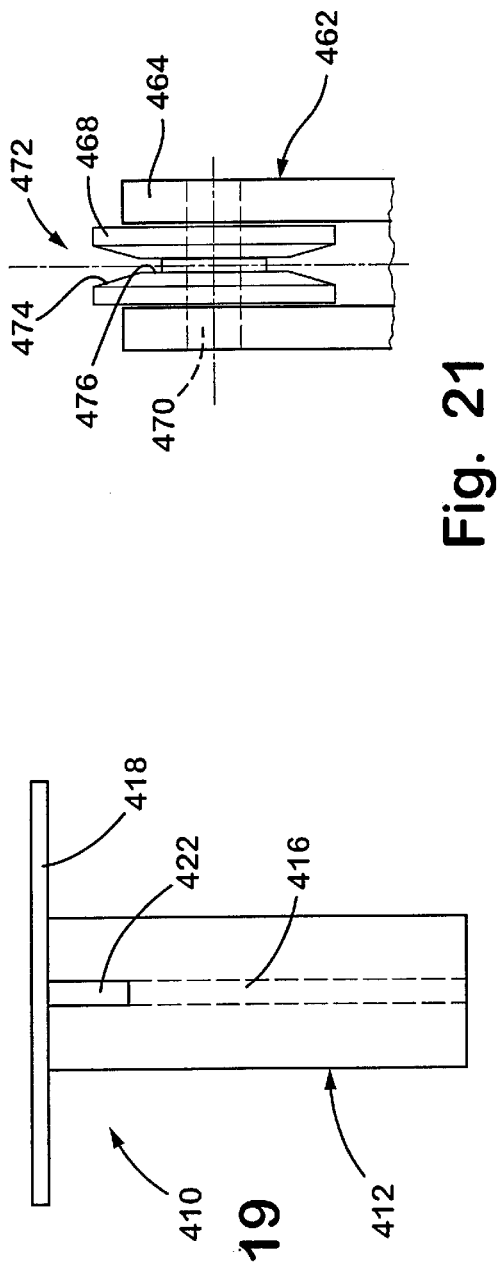

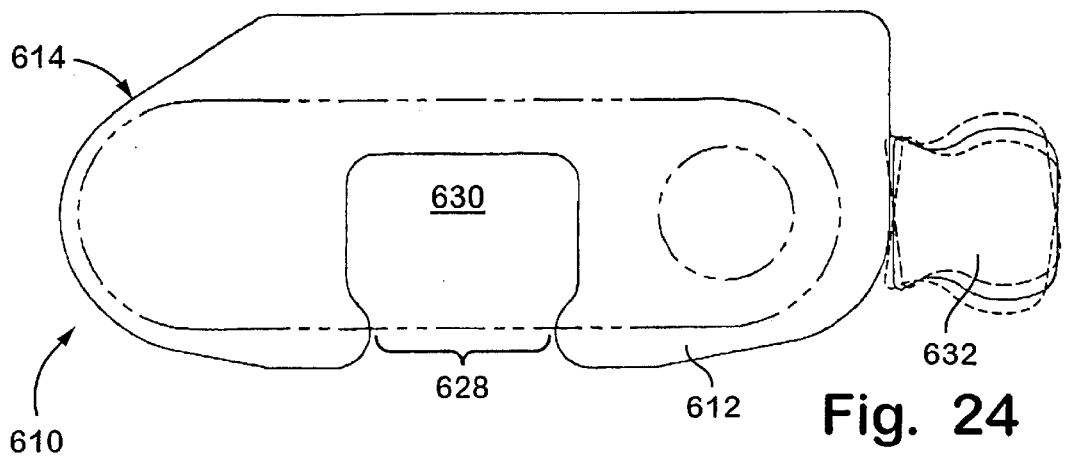
Fig. 24
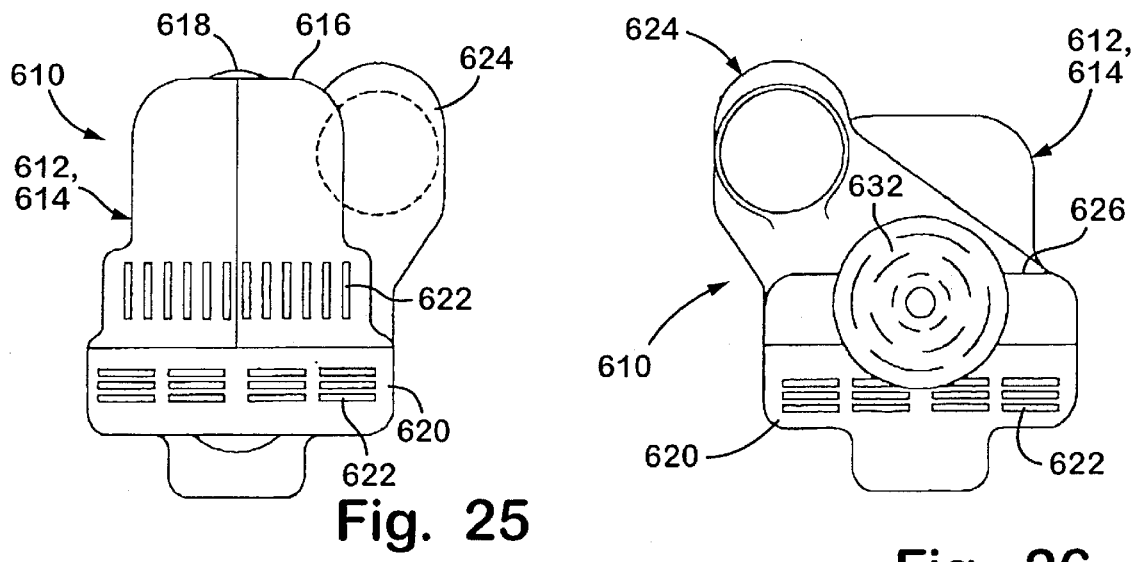
Fig. 25
Fig. 26
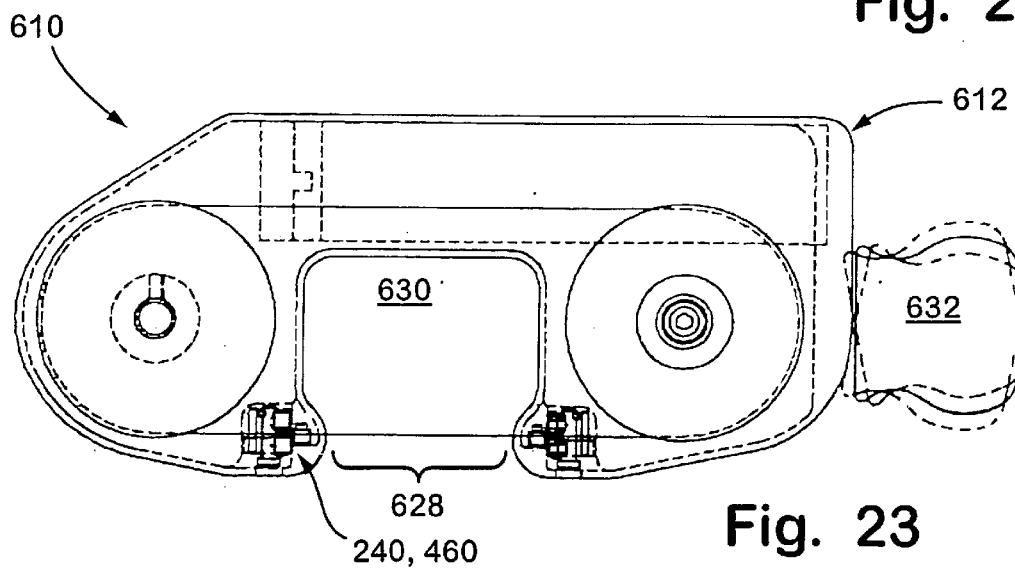
Fig. 23

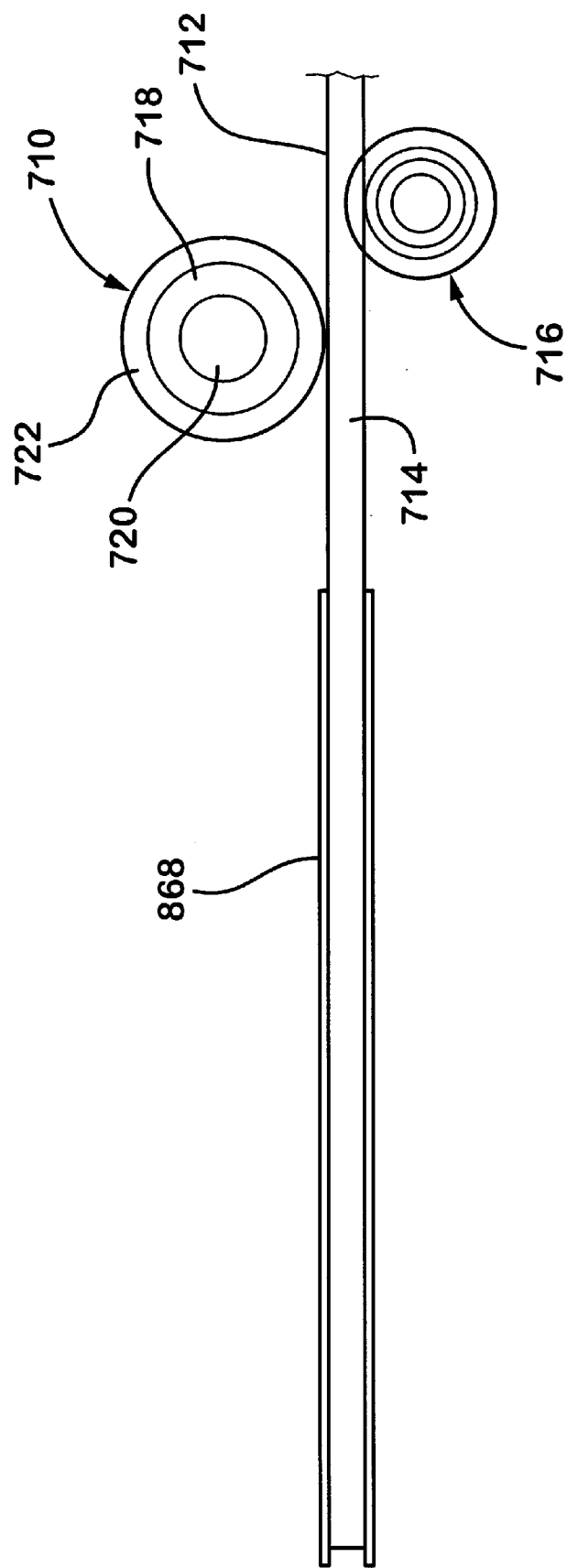

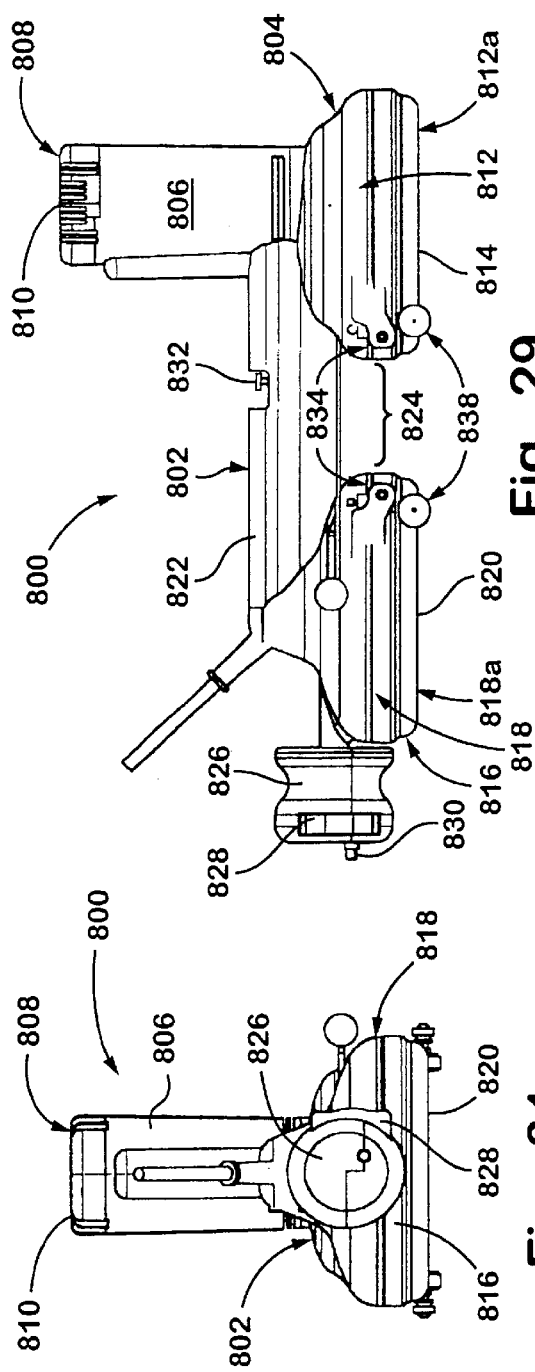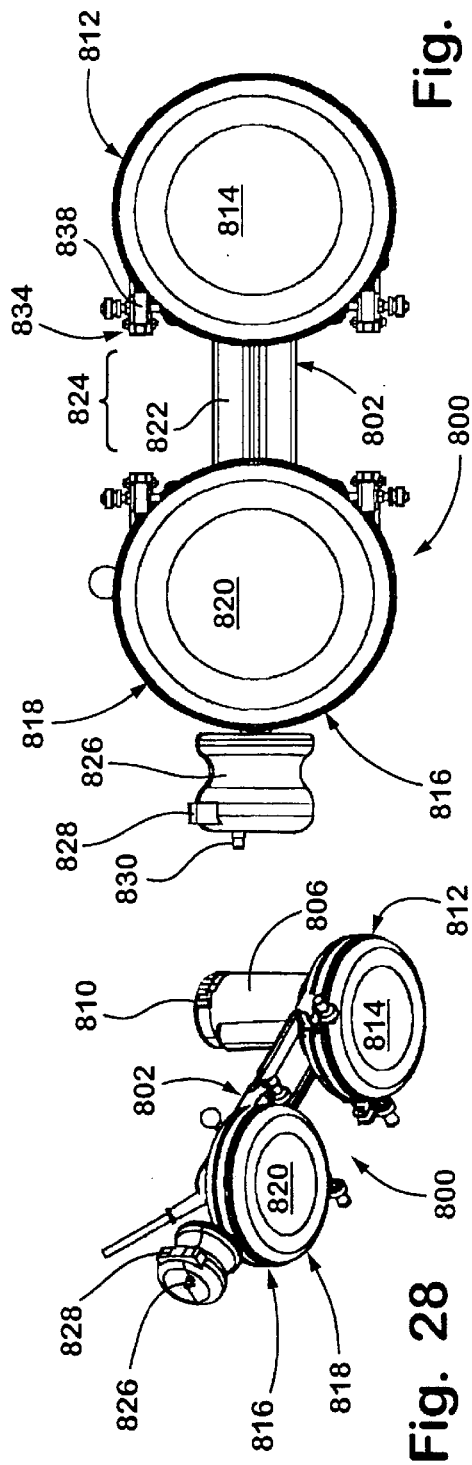

COPING SAW

CROSS REFERENCE TO RELATED APPLICATIONS

This application is a continuation-in-part of copending U.S. patent application Ser. No. 09/531,923 filed Mar. 21, 2000, which claims priority from U.S. Provisional Patent Application Serial No. 60/125,662, filed Mar. 22, 1999, the contents of which are incorporated herein by reference.

BACKGROUND OF THE INVENTION

This invention relates generally to cutting tools, and more particularly to a coping saw assembly.

BRIEF DESCRIPTION OF THE RELATED ART

Carpenters have traditionally used coping saws to cut the joints between crown moulding, chair rails, and other forms of wood and composite moulding. A traditional coping saw is a hand saw having a narrow fixed blade held in tension by a generally rectangular- or square-shaped frame. The depth of the frame provides considerable clearance relative to the fixed saw blade to enable to the saw to be manipulated to cut curves or sharp-angled cuts in wood and other products. Sawing with a traditional coping saw can be slow, arduous, and labor intensive depending on the scope of the project. The operator moves the saw back and forth monitoring the blade to be sure the cut is along the desired curve.

To expedite the coping process, others have attempted to mechanize the tool. For example, the reader is referred to U.S. Pat. Nos. 5,388,334; 5,363,558; 5,220,729; 3,621,894 and 1,955,063. Problems exist with substantially all of the foregoing designs. An important disadvantage associated with the prior saws is they fail to take into account how coping saws are used by the operator. Traditionally, manual coping saws are used to cut complicated curves and profiles. The operator cuts along a first line, backs out, and then approaches the cut from a different angle. The prior powered coping saws made it difficult for the operator to readily back out of the cut and reposition the saw for the different angle. More importantly, the prior saws were clumsy and cumbersome designs requiring the operator to perform athletic maneuvers to position the saw to make the right cut. In versions where the blade reciprocates, it would be difficult to maintain the position of the saw because the force generated by the blade would tend to make the saw chatter and move the operators hand rather than the blade through the workpiece. In substantially all of the prior power coping saw designs, the drive and track systems were complicated and expensive to manufacture.

The instant invention provides a solution to substantially all of the difficulties presented by the prior devices, in that it is easy for the operator to grip and maneuver for different cuts, it is mechanically easy to build, and relatively inexpensive to manufacture.

SUMMARY OF THE INVENTION

The instant invention is a unique mechanized coping saw which provides maximum flexibility to quickly, easily, and accurately cut (cope) a workpiece such as a piece of moulding. In general, the instant invention provides a continuous loop blade disposed between two pulleys which provides two generally parallel and spaced apart saw-blade cutting sections, each traveling in an opposite direction of the other so the user can select the best cutting direction and angle to complete the cut. The instant invention also provides a unique system for retaining the blade on the two pulleys, resulting in a more accurate and reliable blade.

In one form of the invention, the coping saw includes a frame internal to a housing which supports a drive pulley at one end, and a driven pulley at an opposite end. The frame is shaped such that a bridge defines a space between the two pulleys. A continuous loop blade is mounted on the two pulleys such that two blade segments span the space between the pulleys, both blade-segments available to cut the work piece at the election of the operator.

In another form of the invention, the coping saw comprises a housing which provides the framework and support for the spaced-apart drive pulley and driven pulley. The continuous loop blade is mounted at least partially circumferentially around the spaced-apart drive pulley and driven pulley. The drive and driven pulleys each have a circumferential groove for partially receiving a polymeric O-ring or band used to provide traction and tracking of the continuous loop blade around the pulleys.

In another form of the invention, the housing containing the saw provides a work space intermediate the first and the second ends of the housing. It is across this work space that the two continuous blade sections traverse between the two pulleys, providing two cutting sections of blade moving in opposite directions. The availability of the two cutting sections moving in opposite directions provides the operator greater flexibility in cutting options to cope a desired profile.

In yet another form of the invention, the mechanized saw includes a housing having a first and second spaced-apart end portions interconnected by a bridge which defines a C-shaped transverse channel extending between the first and second end portions. The first and second end portions and the bridge are aligned along a first plane of symmetry which includes a longitudinal axis for the housing. A motor is provided in the first end portion of the housing and has a shaft extending from at least one end thereof, the longitudinal axis of which is contained in the first plane of symmetry. A drive pulley is provided in the first end portion of the housing and mounted to the free end of the shaft extending from the motor. The drive pulley is oriented such that it is contained in a plane of symmetry different from, and preferably perpendicular to, the first plane. A carriage is provided in the second end portion of the housing and is configured to be movable between a first and a second position. A driven pulley is mounted on the carriage such that the drive pulley and the driven pulley are approximately contained in the same plane of symmetry. A continuous loop blade is then mounted on the drive pulley and the driven pulley such that first and second sections of the blade span the C-shaped channel at spaced-apart locations. Blade guides are provided in the housing adjacent the transverse channel to provide lateral stiffness and stability to the two blade sections. The drive and driven pulleys rotate the blade, where a first section of the blade moves in one direction opposite to that of the second section of the blade such that both sections of the blade provide opposite cutting actions.

In a further form of the invention, the drive pulley and the driven pulley are slightly misaligned or offset from the second plane of symmetry to assist in tracking and/or retaining the continuous loop blade on the two pulleys. The resulting arrangement of the two offset pulleys, in effect creates a bisected hyperbola which, upon rotation, assists in the tracking of the continuous loop blade on the two pulleys.

In yet another form of the invention, the drive pulley and driven pulley are mounted on a frame by one or more bearings. At least one of the pulleys, and preferably the driven pulley, is mounted to an adjustable carriage which in turn is fixed to the frame-adjustment being provided by a threaded member. The drive pulley includes a shaft extending therefrom which is receivable in a chuck of a power tool selectively coupled and uncoupled with respect to the frame. In this fashion the invention could be in the form of attachment for a conventional power tool such as drill.

In still a further embodiment of the invention, outrigger and guide rollers would be disposed intermediate the drive pulley and the driven pulley to improve tracking of the continuous loop blade about the pulleys, and to increase blade life as the blade does not encounter a rapid bending moment produced by the radius of the pulley. Rather the outrigger rollers provide a gradual feed to the drive and driven pulleys.

In one other form of the invention, the body or housing for the saw may be laterally offset such that the depth of the C-shaped work area is increased. However, in this embodiment, it is envisioned that the lateral offset of the housing will enclose one of the two exposed blade segments. In this configuration, although the parts and components are substantially similar, one of the blades is within the housing, providing a skiving saw or draw saw.

In yet another form of the invention, a polymeric housing is provided which is formed in a manner to provide an intermediate space between two ends of the housing. In one end of the housing, a motor (either electric or air) is provided which is coupled by a shaft to a drive pulley. The other end of the housing contains a carriage which in turn is coupled to and support a driven pulley. In this embodiment, the carriage is adjusted by an over-center lever to move the carriage between a first and second positions. Mounted at least partially around each of the drive and driven pulleys is a continuous-loop saw blade which spans at two spaced apart locations the intermediate space defined between the two ends of the housing. Guide rollers are provided adjacent the intermediate space in a manner to lie adjacent the continuous-loop saw blade to provide support and to reduce the chance the saw blade will come off the drive and driven pulleys during operation. In particular, the guide rollers include at least one anti-backout bearings adjacent each saw-blade section and disposed adjacent the cutting edge of the saw blade to keep the saw blade tracking on the drive and driven pulleys during operation.

The instant mechanism described and claimed herein provides the woodworker substantial artistic flexibility and reliability in a powered saw. Two saw-blade sections, rather than one saw blade, travel in opposite directions so that the operator may elect to one or the other to complete a complex cope. Additionally, substantial strength and alignment is provided to the blades by the guide and support bearings located adjacent the C-shaped channel and the blade. Together with the guide bearings, the two blade segments are adequate to cut soft and hard woods alike in a fraction of the time of conventional coping saws.

These and other features, advantages and objects of the present invention will be further understood and appreciated by those skilled in the art by reference to the following specification, claims and appended drawings.

BRIEF DESCRIPTION OF THE DRAWINGS

FIG. 1 is an elevational cross-sectional view of one embodiment of a powered coping saw;

FIG. 2 is a bottom plan view of the invention shown in FIG. 1;

FIGS. 12A and 12B are an elevation view and plan view, respectively, of the drive wheel;

FIGS. 13A and 13B are an elevation and plan view, respectively, of the driven wheel;

FIG. 14 is a schematic diagram generally illustrating the vertical offset between the drive pulley and the driven pulley to track the blade on the two pulleys;

FIG. 16 is a bottom view of the invention shown in FIG. 15;

FIG. 19 is an end elevation view of the frame weldment;

FIG. 21 is a fragmentary section view of a guide roller taken along line XXI—XXI shown in FIG. 16;

FIG. 23 is a plan view of yet another embodiment of the invention;

FIG. 24 is a bottom plan view of the invention shown in FIG. 23;

FIG. 25 is an end view of the alternate embodiment;

FIG. 26 is a view of the opposite end of the invention shown in FIG. 23;

FIG. 27 is a schematic diagram of a back-out bearing and its placement with respect to the guide roller assemblies and one of the drive or driven pulleys;

FIG. 28 is an oblique view of yet another embodiment of the instant invention;

FIG. 29 is a side elevation view of the invention shown in FIG. 28;

FIG. 30 is a bottom plan view of the invention shown in FIG. 29;

FIG. 31 is an end view of the invention shown in FIG. 30;

DETAILED DESCRIPTION OF PREFERRED EMBODIMENTS

Figure 3:
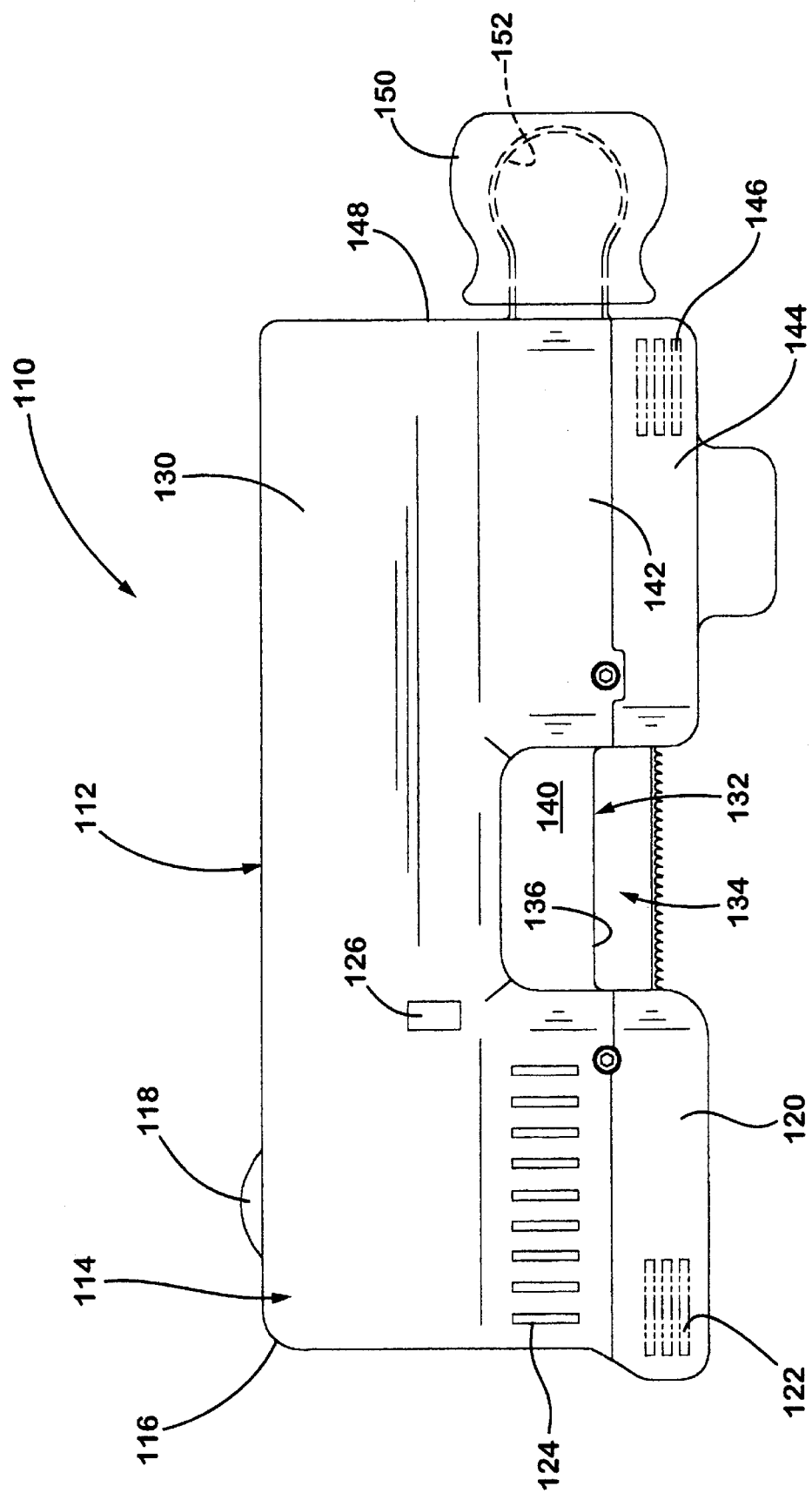
FIG. 3 is a side elevation view of another embodiment of the invention.

For purposes of the following description, the terms "upper," "lower," "left," "rear," "front," "vertical," "horizontal" and derivatives of such terms shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Specific dimensions and other physical characteristics relating to the embodiments disclosed herein are not to be considered limiting, unless the claims expressly state otherwise. It is also understood that the terms wheel, pulley, or rotary actuator are used interchangeably and refer to components which have a rotary motion, full or partial, to produce or impart a linear motion of an associated or connected component.

The instant invention is a powered, hand-held saw for cutting a work piece, including in combination a housing having an intermediate opening separating a first and a second end portions. A drive pulley is mounted in the first end portion of the housing while a driven pulley is mounted in the second end portion. A continuous loop blade extends at least partially around the drive pulley and the driven pulley such that two segments extend across the intermediate opening to provide two exposed sections of the continuous loop blade for cutting the workpiece.

In other form of the invention, the powered hand-held saw includes a continuous loop blade mounted at least partially circumferentially around a spaced-apart drive pulley and a driven pulley, the drive pulley and the driven pulley each have a circumscribing groove retaining an o-ring for providing proper tracking of the continuous loop blade along the drive and driven pulleys, and provide traction to the continuous loop blade on the drive pulley.

Referring to FIGS. 1 and 2, one embodiment of the power coping saw 10 comprising the invention includes a housing 12 preferably formed from injection molded, high impact plastic. Housing 12 may be formed with a plurality of internal bulkheads to provide rigidity and to provide mounting structures or support for the internal components. In the embodiment shown, housing 12 includes a primary handle 14 extending from one end of the housing and a support handle 16 disposed at an opposite end. The support handle 16 may include a secondary function of an adjustment handle for loosening and tightening the saw blade as described in greater detail below. As reflected in FIG. 1, the housing 12 slopes upwardly from support handle 16 toward the primary handle 14, interrupted by an enlarged portion 18 configured to accommodate a motor described in greater detail below. Disposed below the handle 14 may be a trigger assembly 20 for controlling the operation of the saw assembly.

Referring to FIG. 2, the housing 12 is unique in that it includes a bridge 22 interconnecting a front portion 24 to a rear portion 26 proximate handle 14. Bridge 22 provides clearance for the workpiece being cut, and particular, defines work areas 28 and 30 across which continuous loop blade 32 spans. As briefly mentioned above, housing 12 may contain a motor 40 such as a variable speed, geared motor, for rotating the continuous loop blade 32. Motor 40 may be anyone of a number of different motors available from a wide range of manufactures. For example, it is contemplated that motor 40 may be an A/C, 15 amp electric motor used in other power tool applications. Power to the motor may be provided through a plug and cord 42 operably interconnected by a switch assembly 44. Alternatively, motor 40 may be of the type to receive direct current from one or more batteries (not shown) which may be disposed within the housing 12 or handle 14. Power would be provided to the motor 40 through the same trigger assembly 44 adapted to receive power from the battery. In yet another embodiment, it is contemplated that motor 40 may be air driven, connected to a source of pressurized air such as a air compressor or storage tank.

The variable-speed motor 40 includes a shaft 46 mounted with a support bearing 48. The lower end of the shaft 46 may be attached to a horizontally disposed drive pulley 50 described in greater detail below. Actuation of the motor 40 could produce either a selectable clockwise or counterclockwise rotation of the pulley 50. Alternatively, shaft 46 could be interconnected to the drive pulley 50 by a number of intermediate gears to produce the desired amount of torque and speeds as described in greater detail below. However, in this embodiment, the front portion 24 of the housing 12 may include a spindle 60 having a longitudinal axis aligned along a longitudinal mid-line (ML) which in turn defines a first plane of symmetry bisecting the coping saw housing 12 lengthwise. The upper end of spindle 60 may be securely fastened to a carriage 62 configured to translate horizontally and be locked in position by support handle 16. Received along spindle 60 may be a bearing assembly 64 which may be press fit in horizontally disposed pulley 66. Pulley 66 could be retained on spindle 60 by a suitable nut or other fastener 68 attached to spindle 60.

Each of the drive and driven pulleys generally includes a circular disc 80 made either from metal or a polymeric material, and includes a concentric axial passage 82 extending transversely therethrough. The pulleys may be retained on the ends of the shaft and/or spindle by a keyed axial bore configured to mate with a correspondingly shaped key end of the spindle/axle. Alternatively, the axial passages may be splined and configured to mate with a matching set of splines defined on the end of the motor shaft and/or spindle. A set screw or other attachment mechanism may be used to secure attachment. The splines aid in retention of the pulleys and in the case of the motor shaft, ensure the transfer of the rotational force from the motor's axle to the pulley. A nut may also be received along the end of the axle/spindle to retain the pulleys thereon.

Each pulley 50 and 66 includes a circumscribing channel 84 located between upper and lower flanges 86 and 88. In one embodiment, flange 86 may be of a lesser radius or diameter than flange 88 to provide more room to remove or install blades about the pulleys. Disposed in and to one side of each channel 84 is a polymeric ring or O-ring 90 configured to frictionally engage blade 32 and drive it around the pulleys 50 and 66. In a preferred embodiment, the O-ring 90 is disposed in a second channel 85 nested in the bottom of channel 84. With respect to the O-ring 90 on the drive pulley, it provides traction and tracking for the continuous loop blade at least partially circumscribing the pulley. The O-ring 90 in the driven pulley is provided to maintain the blade within the channel 84.

Mounted at four locations within the housing and opposing each other across the gaps 28 and 32, respectively, are pinch and guide roller sets 70A, 70B, and 72A, 72B, respectively. Each roller set may include a pair of rollers, each disposed on opposite sides of the path to be taken by blade 32 and configured to constrain blade 32 along a predefined path across gaps 28 and 30. Disposed outboard of each pinch roller set 70A, 70B, 72A, 72B may be antibackup bearings 74A, 74B and 76A, 76B. It is further contemplated that an additional set of bearings may be provided adjacent the cutting edge of the blade to assist in maintaining the continuous loop blade on the pulleys when the blade is being withdrawn from a kerf. Such "anti-backout" bearings only engage the blade when sufficiently deflected as well be described in greater detail below.

In operation, the operator removes the pulley covers 34 and 36 from the housing by loosening fasteners 38 extending into the housing 12. The covers expose the pulleys 50 and 66 to the operator. The operator then loosens carriage 62 by rotating handle 16 and moving the carriage 62, spindle 60 and pulley 66 toward the intermediate space or work area. The operator may then insert the blade in the channels 94 of the pulleys as desired. With the blade 32 in place the operator simply moves the carriage 62 in the opposite direction to tighten it and locking the carriage in position by re-tightening knob 16. It should be noted at this point that blade 32 may be oriented such that the teeth cut in a clockwise or counterclockwise direction, depending upon the desires of the operator. To change cutting direction, the operator selects the correct switch position for the motor. Additionally, the operator may invert the blade by twisting it inside-out such that the teeth are oriented in a direction opposite that originally set. Once the blade 32 is in place and tightened, the operator then re-installs the pulley covers 34 and 36 using the fasteners 38. Holding the saw in two hands, the operator may then address the work piece and commence use of the saw by engaging blade 32 in space 28 or space 30 to achieve the desired cut. The speed of the blade can be controlled by changing the position of the trigger assembly 20. The pinch rollers 70A, 70B, 72A, 72B assist in providing a taught blade 32 across the gaps 28 and 30, respectively, to ensure a straight and efficient cut of the work piece.

Referring to FIGS. 3–14, an alternate form of the coping saw 110 embodying the invention is shown. As best shown in FIGS. 3–7, the exterior housing 112 is generally elongate, having a first generally cylindrical end 114 configured to retain a motor described below, and to provide a first hand grip for the operator. As in the previous embodiment, housing 112 is preferably formed from a polymeric material using an injection molding technique. However, housing 112 may also be formed from metallic materials using conventional casting methods which are contemplated to be withing the scope of this invention. No matter the type of material used for the housing 112, the upper end 116 may include a generally centrally disposed power switch 118 which may be a variable position switch or a multi-position switch for controlling the speed of the motor. The opposite end of the cylindrical portion 114 of the housing 112 may taper outwardly into an enlarged detachable housing cover 120 concealing one of the two pulleys described below. Cover 120 as well as a portion of the cylindrical portion 114 of the housing 112 may contain vent holes 122 and 124 to expel debris cut from the workpiece and to cool the enclosed motor. Also contained and extending through the cylindrical portion 114 of the housing 112 may be a directional switch 126 to control the operational direction of the motor.

Figure 4:
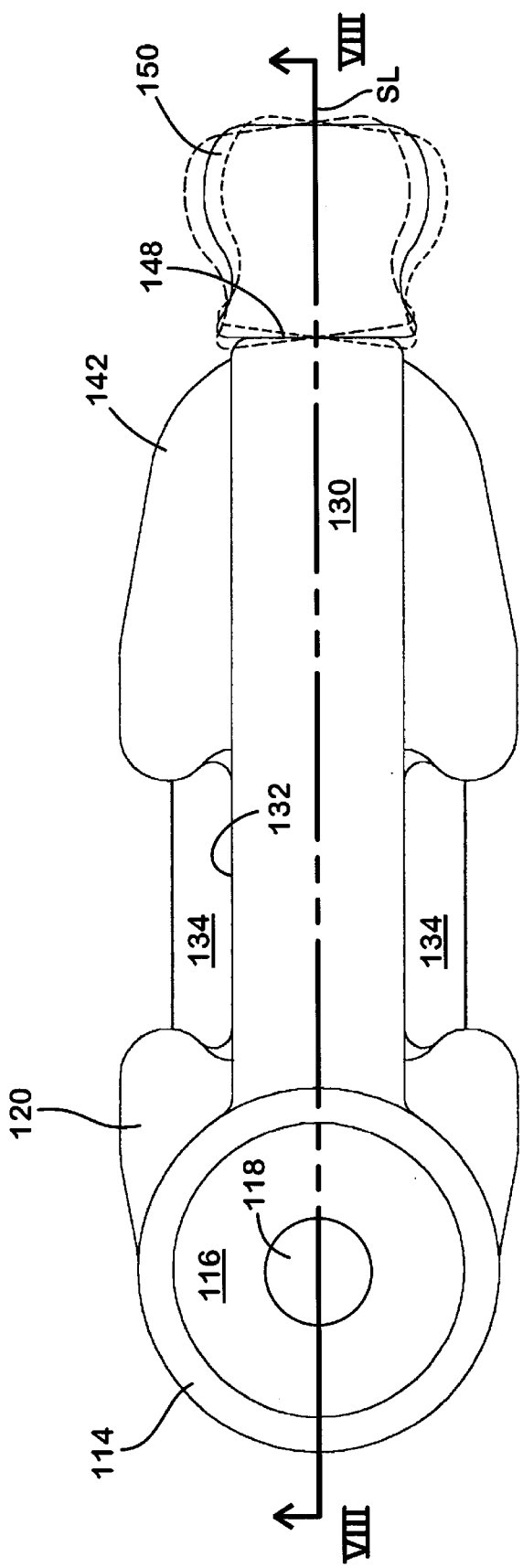
FIG. 4 is a plan view of the invention shown in FIG. 3.
Figure 5:
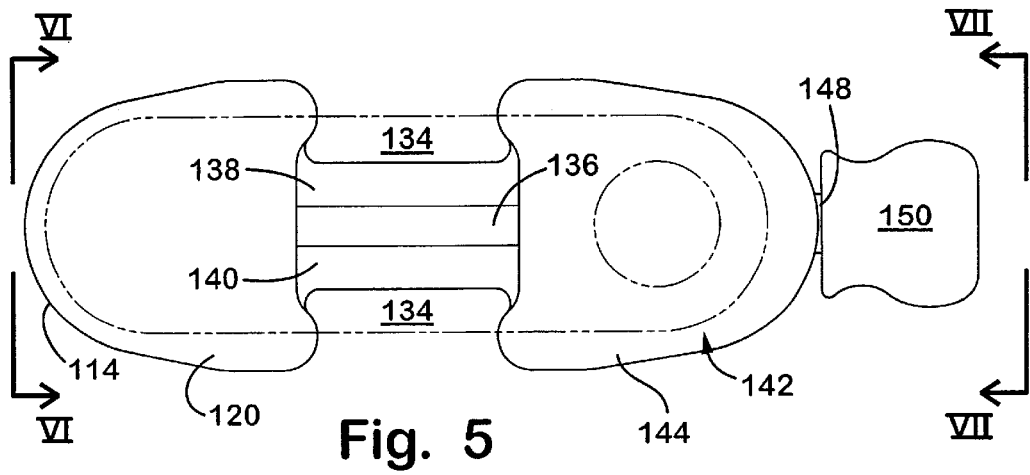
FIG. 5 is a bottom plan view of the invention shown in FIG. 3.
Figure 6:
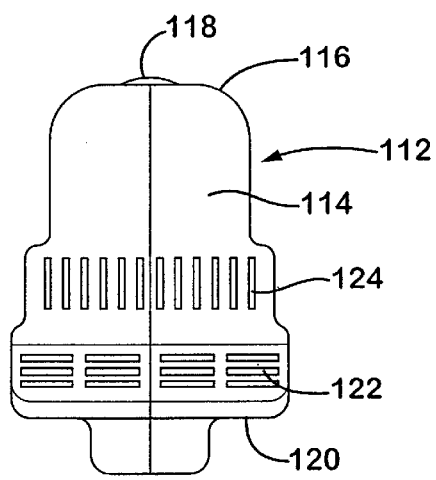
FIG. 6 is an end elevation view of the invention shown in FIG. 3.
Figure 7:
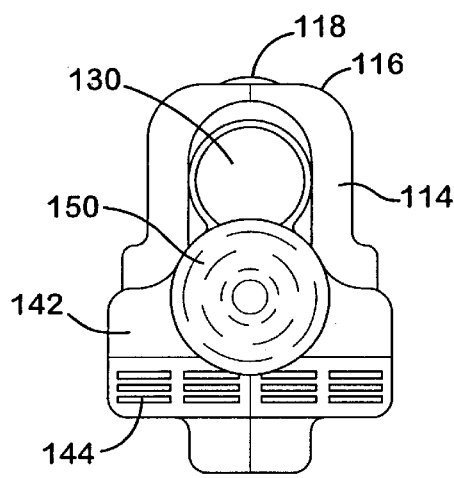
FIG. 7 is an opposite end view of the invention shown in FIG. 3.

Extending radially from end 114, and extending along the length of the housing 112, is a generally tubular or elongate portion 130. The elongate portion 130 is located toward the upper portion 116 of the saw where it forms a bridge 132 over an intermediate space or work space 134. The lower edge 136 of the bridge is defined by two sloping or gently curved surfaces 138 and 140 extending down from the elongate portion 130 (FIG. 5). In a preferred embodiment, the elongate portion 130 is configured to internally receive and retain a rechargeable battery pack described below for providing power to the saw motor. It should be noted that the elongate portion 130 may be aligned along a longitudinal axis of the saw to provide two generally equi-area work spaces, or it may be laterally offset to increase the size of the work space. The latter embodiment will be described in greater detail below. Spaced from cylindrical portion 114 across the bridge 132, and depending from the elongate portion 130, is a second enlarged end portion of the housing 142 configured to house the second of the two pulleys for the saw (FIGS. 3–5, and 7). A second pulley cover 144 is attached to portion 142 to conceal the second pulley. Vent holes 146 are also provided to help expel debris cut from the workpiece.

It is contemplated that housing 112 and pulley covers 120 and 144 may be made from a polymeric material, preferably a high strength impact plastic, using well known injection molding techniques. In the case of housing 112, it is contemplated that it may be made in two pieces, divided by a line of symmetry extending longitudinally along the housing and passing from the top to the bottom as best shown in FIG. 4 by the symmetry line SL. The bi-symmetrical housing 112 can be designed with bulkheads and other internal structural supports to provide mounting points for the internal components while at the same time provide increased strength where needed to accommodate bending moments and internal stresses. With respect to the pulley covers 120 and 144, each may also be made from a high impact polymeric material using the same injection molding techniques, but molded as single components configured to mate with housing 112. Small openings are provided to permit ingress and egress for the continuous loop blade. It is contemplated that the pulley covers are retained on the housing by mechanical fasteners such as screws. However, it is further contemplated that the pulley covers may be retained using a pressure fit connection and snapped in place over the portions of the housing.

Pivotally attached to the opposite end 148 of housing 112, below the terminus of the elongate portion 130 above end portion 142, is a handle 150. Handle 150 may be mounted to a ball-like structure 152 (FIGS. 5 and 8) integral with and extending from the end 148 of the housing 112 to permit the handle to swivel and move slightly about a conical arc. The coupling is such that handle 150 is free to rotate as well as partially swing about an axis parallel to the symmetry line SL and forming the axis for the ball-like protrusion 152.

Figure 8:
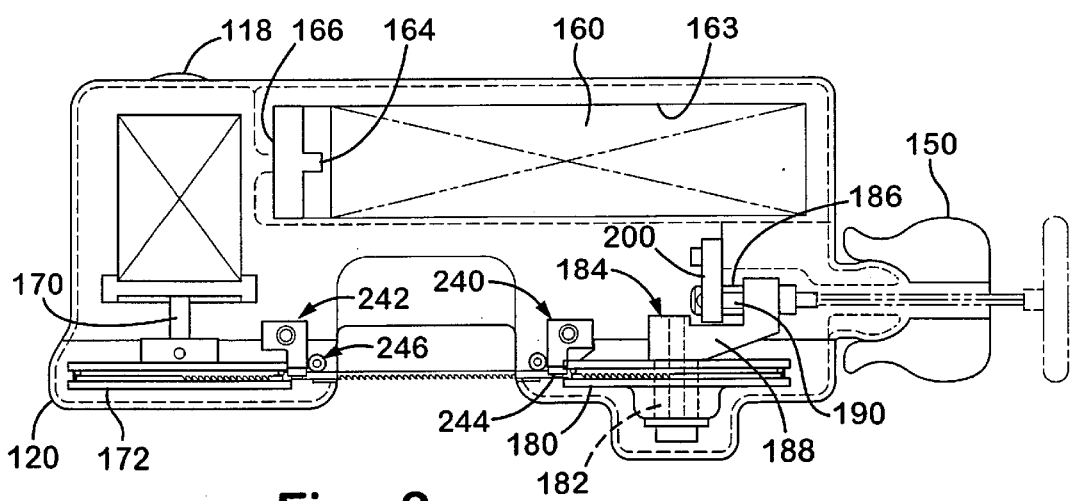
FIG. 8 is a section view taken along line VIII—VIII shown in FIG. 4.

Referring to FIGS. 8–14 and 20, the general internal components of the coping saw 110 are shown. As briefly mentioned above, housing 112 is preferably a molded two piece housing. The interior of the housing halves are preferably formed by injection molding to include trusses, bosses, bulkheads and other structurally features to provide mounting points for each of the component, where necessary, and to provide structural support for the housing. Referring to FIG. 8, a battery pack 160 may be received within a battery housing 162 formed in the interior 163 of the elongate portion 130. The battery pack 160 may be inserted and removed through an opening formed in the end 148 of housing. The battery housing 162 includes battery contacts 164 at one end 166 of the cavity 162 to provide electrical continuity with the circuits within the housing. Alternatively, an AC adaptor may be received within the battery housing 162 to permit operation using conventional electrical current. It is contemplated that the battery contacts or AC adaptor may be polarized, providing a male and a female contact member. Alternatively, the battery pack or adaptor 160 may have a particular shape configured to be received in housing 162 in a single way such that the approximate electrical contact is arranged.

The contacts 164 of the battery or AC adaptor are in turn operably coupled to switch 118 located in the top of the saw.

The switch 118 is also operably coupled to a directional switch 126 to control the direction of rotation of the motor. Located within the housing 112 and below switch 118 is motor 168 which is operably connected to the battery/adaptor contacts 164. It is contemplated that motor 168 may be a bidirectional electric motor and capable of being powered for a substantial amount of time by a single charge of the battery pack 160. Although an electrical system is disclosed, it is contemplated alternative drive systems may be employed with equal success. Of these, air driven systems are particularly visualized. It should be a rather mechanical substitution to replace the electrical driven motor with the compressed air driven system and is considered to be within the scope of this invention.

Extending from at least one end of the motor 168 is a drive shaft 170. The free end of the drive shaft 170 is interconnected to the drive pulley 172. In a preferred embodiment, drive shaft 170 includes a keyed portion which is received in a similarly shaped hole (not shown) in the drive pulley, and coupled together by a set screw 174 extending into a hole (not shown) to the shaft to keep the pulley on the shaft. Alternatively, and described in greater detail below, the drive shaft 170 may be interconnected to the drive pulley 172 through a gear assembly wherein the revolutions of the motor 168 are either increased or decreased a determined amount in order to achieve the desirable number of revolutions per minute for the continuous loop saw blade. An example of one such gear assembly is described in greater detail below.

Figure 10:
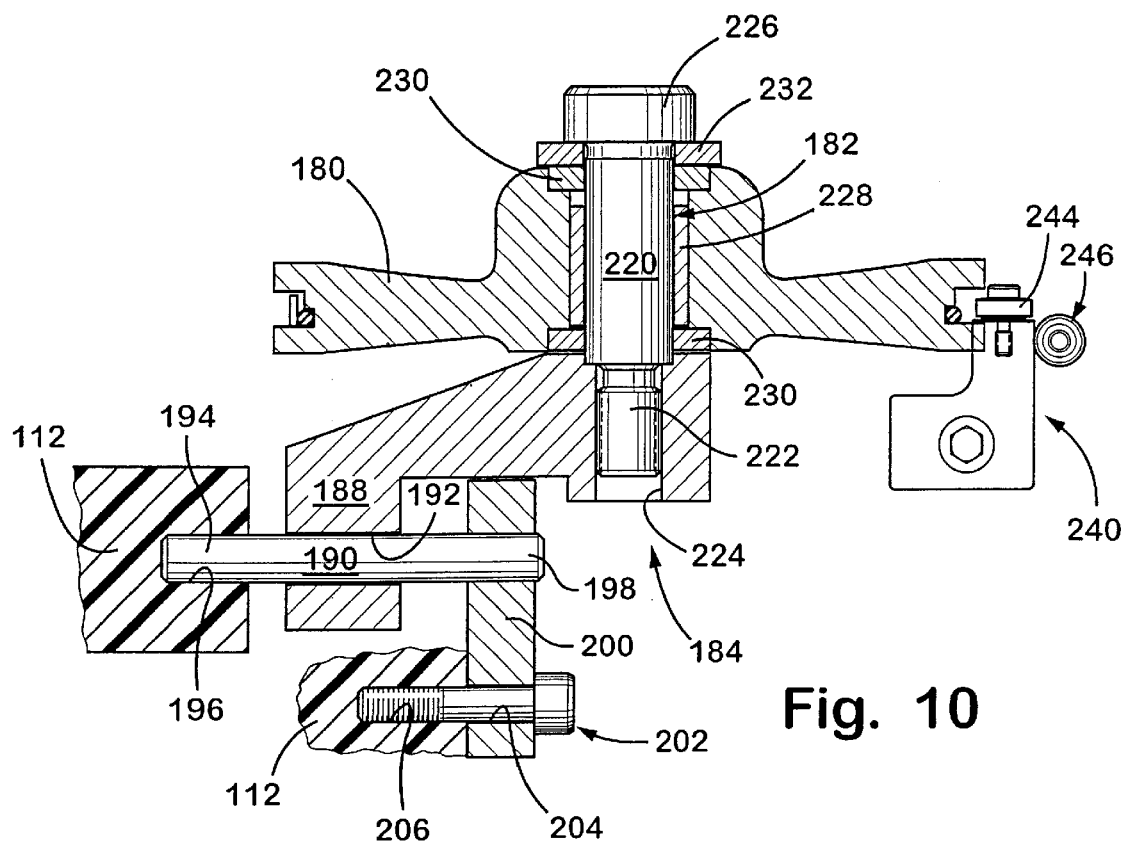
FIGS. 10 and 11 are fragmentary section views illustrating details of a carriage.
Figure 11:
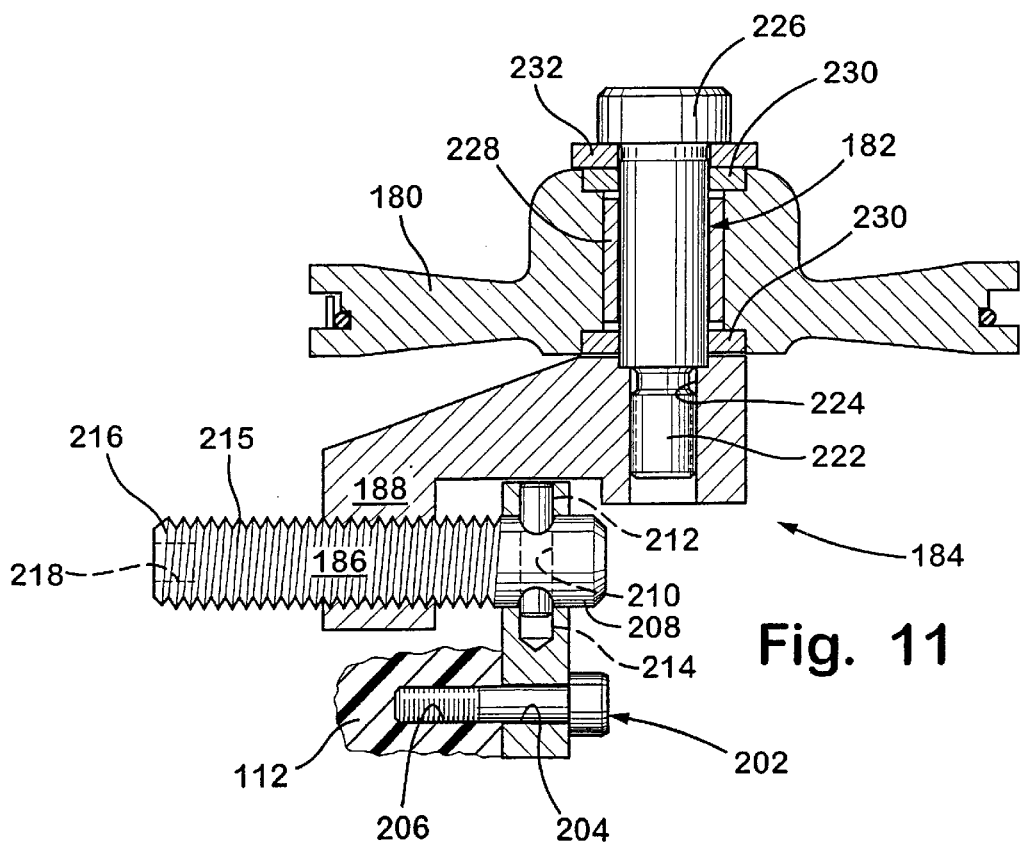

Disposed in sliding engagement in the opposite end 142 of the housing 112 is a second or driven pulley 180. FIGS. 10 and 11. Driven pulley 180 is mounted on a spindle 182 extending from a carriage 184. In one embodiment, carriage 184 is mounted on an adjustable screw or conveyor 186 extending through a flange 188 depending from the carriage 184. Adjacent and on opposite sides of the screw conveyor 186 are guide pins 190 which extend through corresponding holes 192 in the flange 188. Both of the guide pins 190 are fixed with respect to the carriage to the interior of the housing 112. As best shown in FIG. 10, one end 194 of each guide pin is fixed in a recess 196 formed in the housing 112. The opposite end 198 of each guide pin is fixed to a plate 200. The plate 200 is, in turn, fixed in place by fasteners 202 extending through holes 204 in the plate 200 and anchored in recesses 206 formed in the housing interior. With respect to the screw conveyor 186, (FIG. 11) proximate one end 208 is an annulus 210 which is partially staked by a pin 212 extending downwardly adjacent screw 188 into a bored hole 214. Thus, conveyor screw 186 is free to rotate about its axis and cause the movement of threads 215 which engage compatible threads in the interior of the hole passing through flange 188. The opposite end 216 is likewise captured loosely within a bore (not shown) in the housing interior 112 for reasons which will become apparent below. The end 216 also contains a recessed polygon or shaped recess 218 adapted to receive the end of a polygon shaped wrench. To adjust the carriage, the polygon shaped wrench such as a hex wrench, is passed down through the axis of the handle 150, ball-shaped protrusion 152, and into housing 112 to engage the end of the screw. By rotating the wrench, the carriage moves toward or away from the drive pulley to permit the change of blade.

Referring again to FIGS. 10 and 11, the spindle 182 may be formed from a shaft 220 having a threaded end 222 at one end and received in a bore 224 formed vertically in the carriage 184. The other end of the shaft 220 may terminate in a head 226, having shaped exterior for a wrench, or having a countersunk bore to receive the end of a Allen wrench or similar tool. The pulley 180 may also be mounted with bearings such as roller bearings, needle bearings, and thrust bearings, referenced generally by numerals 228 and 230. A washer may also be provided between the head 226 and the upper bearing 230 to provide best possible rotation of the pulley 180.

Figure 9:
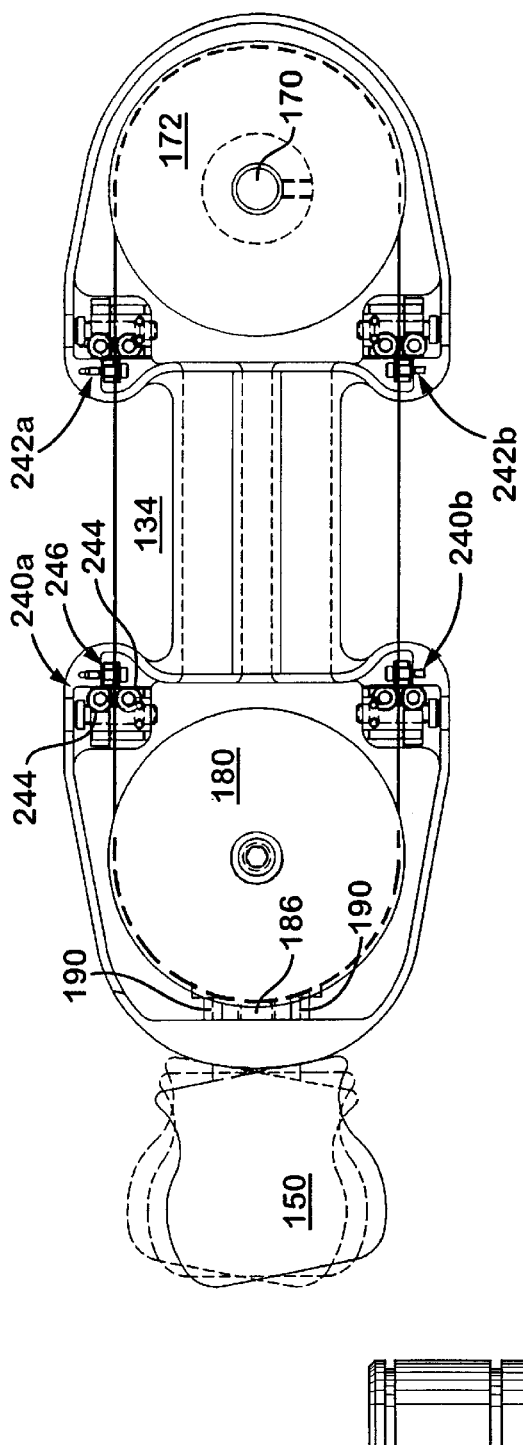
FIG. 9 is a bottom view of the invention with the protective covers removed.
Figure 20:
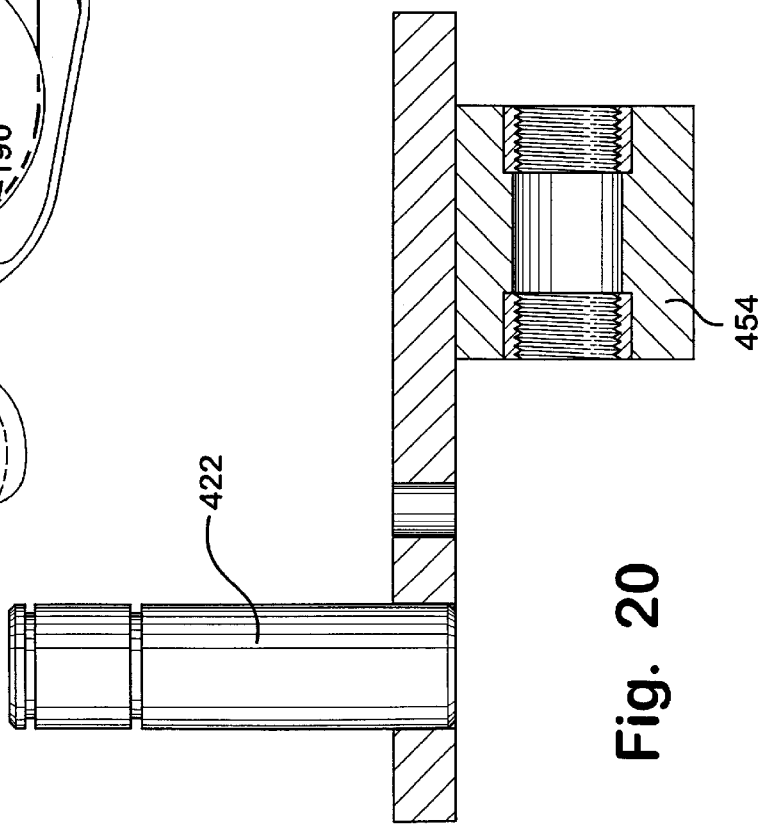
FIG. 20 is a elevation view of an adjustable mounting plate for the driven pulley.

Referring to FIGS. 9 and 10, located generally between drive pulley 172 and driven pulley 180, and mounted to the interior of the housing 112 opposite each other across the work space 134 are blade roller sets 240a, 240b and 242a, and 242b. Each set such as 240a includes two pinch rollers 244 mounted opposite each other perpendicular to the path followed by the continuous loop blade. The pinch rollers 244 are adjustable so the distance between them can be adjusted to limit the lateral movement of the continuous loop blade there between. Each set also includes at least one anti-backup bearing 246 positioned adjacent the band side of the blade. The anti-backup bearing helps stiffen the blade when pressure is applied by the operator during the cutting process. The bearings also help keep the blade in the circumscribed channel of the respective pulleys. The height of the anti-backup bearings is also preferably adjustable to accommodate blades of different depths and widths. The adjustment point for each of the respective roller sets is preferably accessible through the exterior of the housing 112 using a conventional screw driver, Allen wrench, or other tool.

Drawing FIGS. 12A and 12B generally illustrate the driven pulley 180. FIG. 12A illustrates an elevation view and FIG. 12B represents a plan view. As seen in the two figures, the pulley includes a raised central portion or hub 50 which extends from upper surface 252. Concentric with hub 250, and extending entirely transversely through pulley 180 is an axial passage 256, the upper end of which terminates in a substantially greater diameter recess portion 258 while a corresponding recess 260 exists in the lower or opposite end of the passage. The dimensions of the respective passages 256, 258, and 260 are such to receive conventional needle, roller, or thrust bearings such as 228 and 230 shown in FIGS. 10 and 11. The perimeter 262, generally circular in plan form as shown in FIG. 12B, includes a circumscribing channel 264 defined by upper and lower flanges 266 and 268. A second channel 272 is nested in the bottom wall 270 with a channel 264. It is noted that nested channel 272 is off set with respect to a center line between flanges 266 and 268, and is preferably oriented toward the lower flange 268. The nested channel 272 is adapted to receive an O-ring 274 which extends around the entire circumference of the channel 272. Referring to FIG. 12B, the perimeters 262 of the flanges 266 and 268 have differing diameters. The diameter of the perimeter to flange 268 is slightly larger than that of the flange 266 as represented by reference numerals 276 and 278 respectively as it is believed the reduced diameter of the upper flange 266 will aid the operator in installing and replacing the continuous loop blades.

FIGS. 13A and 13B generally provide an elevation view and plan view of the drive pulley 172 briefly described above. The drive pulley generally includes a slightly concave upper surface 280, and a lower surface 282 which is also slightly concave, but includes a central coaxially extending hub 284. Concentric with hub 284, and extending entirely through pulley 172 from side 282 through the end 286 of the hub is an axial passage 288. Intersecting passage 288 at a generally right angle, and extending through hub 284 is a transverse passage 290 which has a threaded interior wall. In one environment, axial passage 288 may have a flat or keyed surface 292 which provides the intersecting surface for the transverse axial passage 290. The key 292 is intended to align with and receive a similar shaped portion of the shaft mentioned above which extends from the motor within the housing. The transverse passage 290 is intended to receive a set screw or other fastener threaded therein which is then urged against the keyed portion of the shaft to retain the pulley 172 on the end of the shaft.

As better illustrated in FIG. 13B, the pulley 172 includes a perimeter 294 which contains a circumscribing channel 296 defined between upper and lower flanges 298 and 300. Contained within channel 296 and formed in the bottom wall 302 is a second channel 304 which is similar to channel 272 described above. In the embodiment of the drive pulley described herein, it is also preferred that nested channel 304 be laterally offset towards the lower flange 300. The nested channel 304 is similarly configured to receive a O-ring 306 to provide traction to the continuous blade, and to similarly provide a tracking to the blade as it rotates between or around the drive and driven pulleys.

Referring to FIG. 14, this illustration shows a vertical offset between the height of the drive pulley 172 and the driven pulley 180. To simplify matters, the height difference is shown as a ΔX between the O-rings 274 and 306 and their respective pulleys. In one embodiment, the vertical offset between the respective pulleys is approximately 0.007 and 0.030 inch; and preferably about 0.015 inch. It is believed that the combination of the O-ring offset in the nested channel 272 and 304 of their respective pulleys 172 and 180, coupled with the offset in the vertical access between the two components, the continuous loop blade is automatically centered or tracked properly within the channels 264 and 296 and retained on the pulleys. For the purposes of this application, the vertical offset between the drive and driven pulley, coupled with the location of the O-rings in the nested channels 272 and 304, will be referred to as the bisected hyperbola technique or structure.

In operation, the operator inserts the adjustment wrench to the central portion of the handle 150 and the ball-like protrusion 152 such that the end of the wrench is received in the recessed 218 formed in the end 216 of the threaded screw 186. Rotation of the wrench causes the carriage 184 to move along the screw 182 and the guide pins 190 in a direction generally parallel to the longitude axis to the saw 110. By removing the caps or covers 120 and 144, the operator can then access the continuous loop saw blade around the pulleys 172 and 180. By rotating the wrench in a first direction, the carriage 184 will move toward the pulley 172 to provide sufficient room to either remove or install a new continuous loop blade into the channels 264 and 296 of the pulleys. By rotating the wrench in the opposite direction, the carriage 184 will move away from the pulley 172 to tighten the continuous loop blade. It is contemplated that there should be sufficient tension or resistance in the threaded screw 186 to prevent inadvertent loosening or movement of the carriage 184 along the screws 186 and/or guide pins 190.

Once the continuous loop blade is in place and tightened, the operator then reinstalls the pulley covers to protect the pulleys and the guide bearings from a direct impact. The operator then inverts the saw by grasping the cylindrical end portion 114 in one hand, and the handled portion 150 in the opposite hand. The pivoting aspect of the handle 150 permits the operator to rotate the saw about the longitudinal axis of the saw to permit easy use. To actuate the saw, the operator simply depresses the switch 118 with his thumb to cause the blade to rotate about the pulleys. The direction of the blade rotation may be changed by the operator changing the switch 126.

As the blade rotates, the guide bearings or roller sets 240 and 242 provide lateral stiffness to the blade, while the backup roller 246 provides a vertical stiffness across the work space 134. The combined tension on the blade provided by the translatable carriage 184, the pinch roller sets 244 and the back up bearings 246, the two sections of the saw blade traversing the work space 134 are quite robust and access the work space quite easily.

As briefly mentioned above, it is contemplated that the instant invention may be configured as an attachment or accessory to a conventional power tool such as a rotary drill. One such embodiment is shown in FIGS. 15 through 21. As shown in the drawing figures, a frame 410 is provided, formed from an elongate metallic plate such as one-quarter inch thick aluminum stock. An intermediate section of the frame 410 includes a first upright member 412 extending substantially perpendicular thereto and spaced from a second upright member 414 of significant lesser height. Interconnecting the first and second upright members, and providing flexural stiffness to the frame 410 is a T-shaped flange 416. Also mated to the frame 410 and extending from opposite sides thereof are a first and second guide roller mounting plate 418 and 420, respectively-the first guide roller mounting plate 418 preferably terminating proximate the first upright member 412 and the second guide roller mounting plate 420 extending slightly past the second upright member 414. A gusset or brace 422 may interconnect the first guide roller mounting plate 418 to the first upright member 412.

Figure 15:
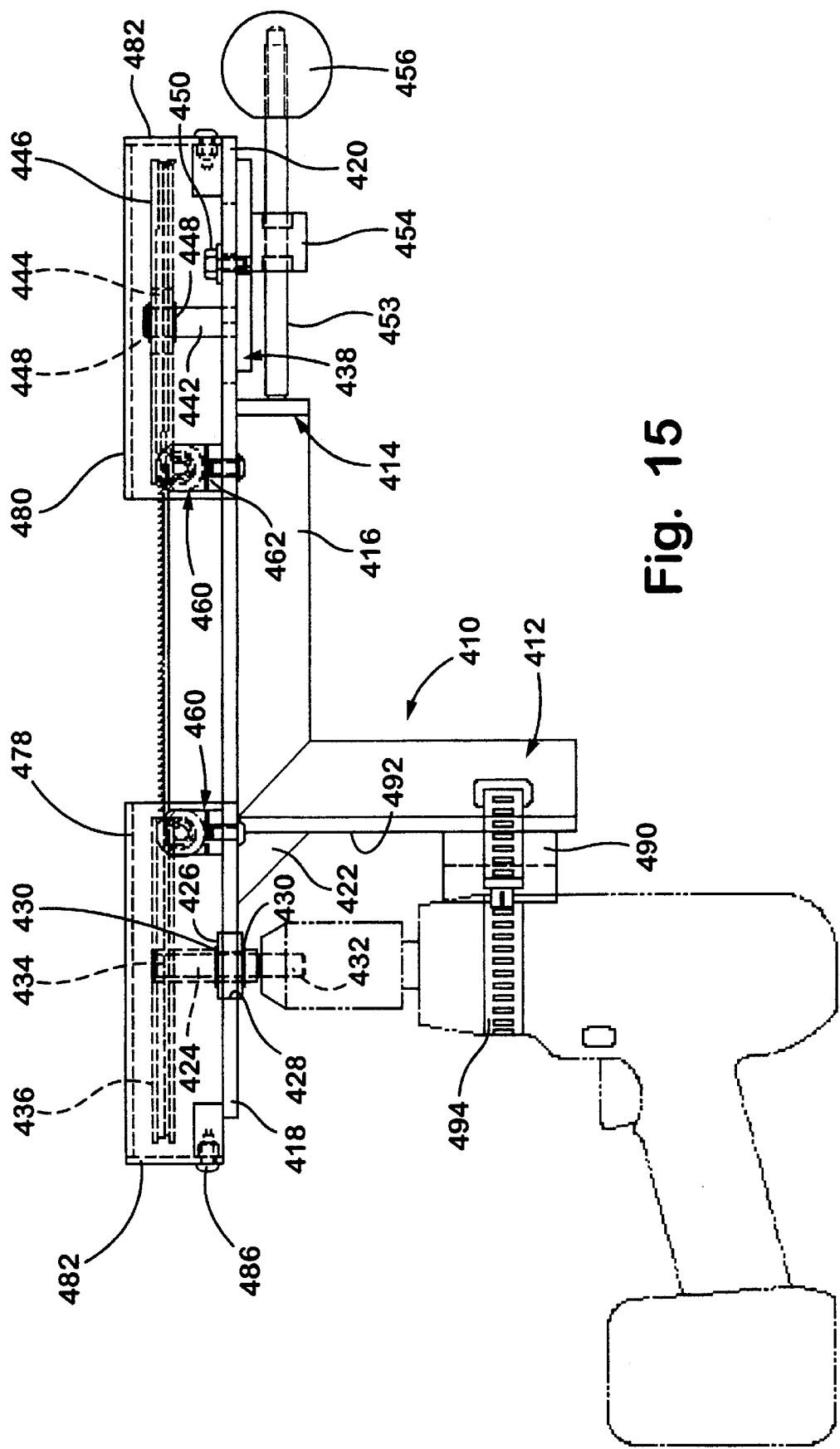
FIG. 15 is a side elevation view of yet another embodiment of the invention.
Figure 17:
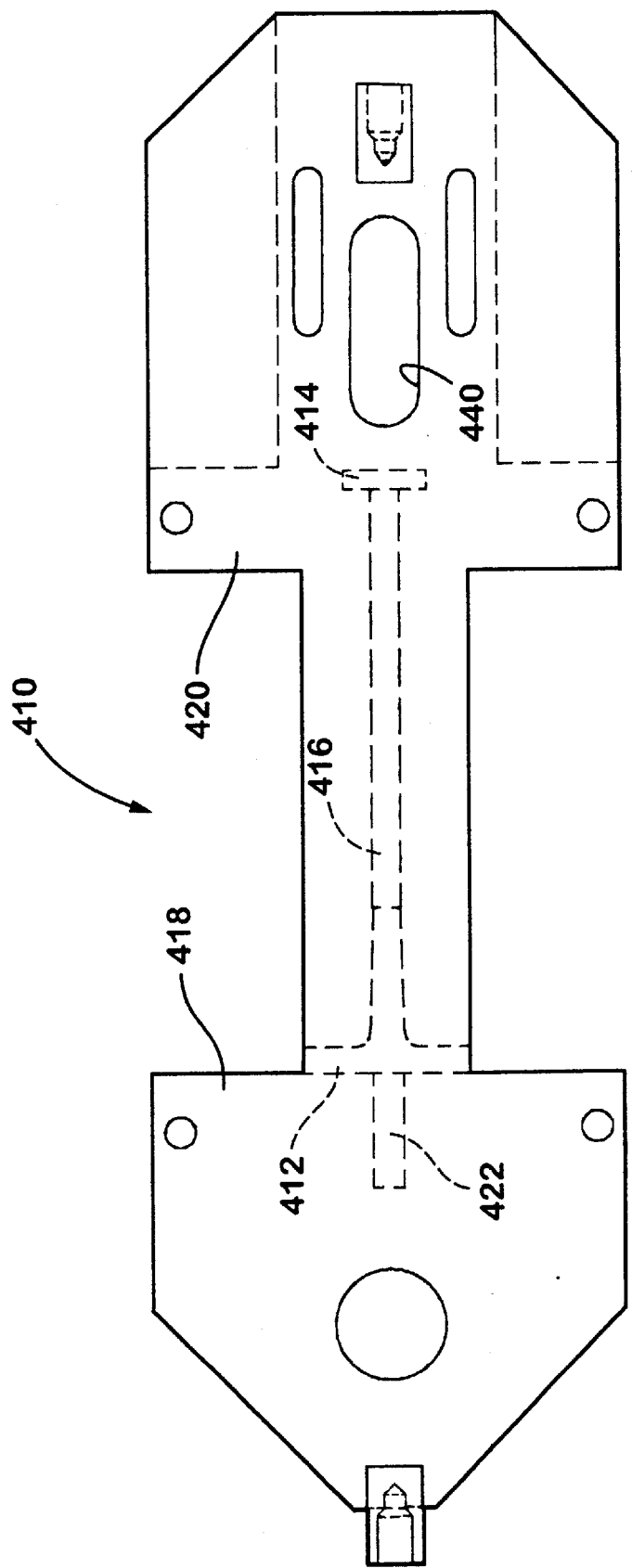
FIG. 17 is a bottom plan view of frame weldment for the invention shown in FIG. 15.
Figure 18:
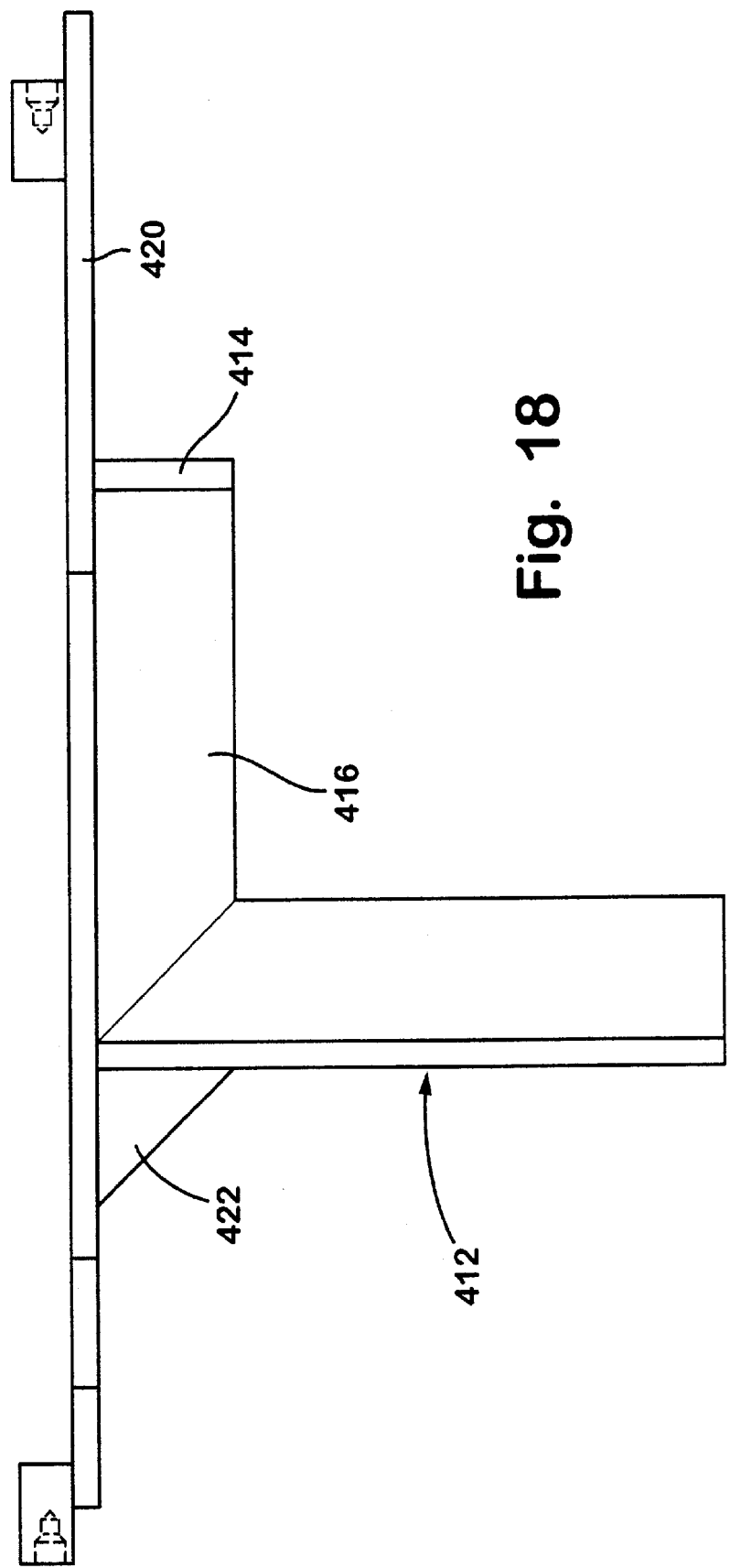
FIG. 18 is a side elevation view of the frame weldment.

Referring to FIGS. 15 and 16, a drive shaft 424 is mounted perpendicularly to frame 410 by a bearing 426 mounted in a hole 428 formed in the frame 410. Bearing 426 may be a conventional roller bearing and the drive shaft 424 maybe retained within bearing by split rings 430 received in grooves on opposite sides of the bearing. One end of the shaft 432 is adapted to be received in a collet of a rotary drill while the opposite end 434 is press fit to a pulley 436.

At the opposite end of the frame 410, a driven pulley mounting plate 438 is attached in sliding relationship to frame 410. Mounted to plate 438, and extending substantially perpendicularly therefrom, and up through slot 440 in frame 410, is the driven pulley shaft 442. The upper end of shaft 442 is configured to receive a bearing 444 mounted in driven pulley 446. Split rings 448 are received on the shaft 442 on opposite sides of the bearing 442 to retain the driven pulley in place. Fasteners 450, extending through long slots 452 on opposite sides of the oval slot 440, are received by the mounting plate 438 and are used to fix the mounting plate in position with respect to the frame 410. A threaded rod 453 extending through block 454 is provided for placing tension on the continuous blade extending around pulleys 436 and 446. The handle 456 at the end of the rod 452 permits the user to obtain a good grip in rotating the threaded rod 452. The opposite end of the threaded rod 452 engages the section member 414 to urge the mounting plate 438 to the right as shown in FIG. 16.

Disposed between pulleys 436 and 446, and located at each end of the guide roller mounting plates 418 and 420 may be guide roller assemblies 460, i.e. having a guide roller 472 mounted to a bracket 462 (see FIG. 21). A bolt or other fastener extending through the mounting plate 418, 420 is received in the bottom of the bracket 462. The opposite end of the bracket includes a yoke 464 for retaining the guide roller 468 with a transverse pin 470. Shown in FIG. 21, each guide roller 468 has an annular grove or channel 472. The channel includes an upper tapered wall portion 474 wherein the angle between the tapers may be on the order of 20 to 40 degrees. Nested in the bottom of the tapered wall portion is a more rectangular channel portion 476, the dimensions of which are just slightly larger than the thickness of the continuous loop blade used in the power coping saw. The depth of the rectangular channel portion is also slightly less than the overall thickness of the blade such that when the continuous loop blade is in the channel, the tooth section of the blade is within the tapered wall portion while the opposite edge of the blade resides or rests in the bottom of the rectangular channel portion. The conventional needle-bearing or similar type of bearing structure is fitted concentrically within the roller axis of the bearing and mounted on the bracket 462. Although the guide roller 468 is described as having tapered inner walls 474, it is contemplated that guide rollers having vertical walls (not shown) will also work satisfactorily in providing support to the continuous loop saw blade. It should also be noted that guide roller assembly 460 described herein may be used on any one of the prior embodiments of the powered coping saw described above as the roller bearing permits the partial withdrawal of the continuous loop saw blade vertically and automatically receives the saw blade when the blade again rests within the bearing. This could be particularly advantageous when withdrawing this saw blade from a kerf of a cut made by the saw.

Referring again to FIGS. 15 and 16, the drive pulley 436 and the driven pulley 446 may be at least partially enclosed by covers 478 and 480. Each cover may include a generally U-shaped vertical wall 482 having an upper edge mounted to a plate 484. One or more fasteners 486 are intended to extend through the vertical wall 482 into threaded blocks attached to the frame 410.

As briefly mentioned above, the power source for the powered coping saw shown in FIGS. 15 through 21 is contemplated to be a conventional rotary tool such as a rotary drill. Given the substantial number of different rotary drill designs on the market, a variety of attachment members are anticipated to be necessary to attach a rotary drill to the frame 410. In general, a universal cradle 490 (FIG. 15) may be designed for the variety of different rotary tool designs and configured to be attached to side 492 of the first upright member 412. U-shaped bolts having appropriate dimensions may be provided and adapted to be received over a portion of the rotary drill housing wherein the ends of the bolts could be received in the first upright member 412. Wing nuts or conventional nuts could be received over the ends of the U-shaped bolts and tightened to fix the rotary drill in position such that the chuck of the drill is aligned with and receives the one end of the drive shaft 424. Alternatively, an adjustable clamp 494, such as a modification of a hose clamp, may be used to hold the power source against the attachment.

In operation, the operator mounts the rotary drill to the frame 410 using the specially configured cradle and fasteners/clamps. The operator then tightens the chuck of the drill on the end of the drive shaft 424. If the operator desires to increase the tension on the continuous loop blade extending around the pulleys 436 and 446, the operator loosens the fasteners 450 extending through the frame 410 and into the driven pulley mounting plate 438 and simply rotates the threaded rod 452 such that one end is urged against the second upright member 414. Such an action causes the mounting plate 438 and driven pulley 446 in a direction away from the drive pulley 436. When the desired tension is reached, the operator simply tightens the fasteners 450 sufficiently to hold the mounting plate 438 in place. At that point, the operator is then free to loosen the rod 452 such that the handle 456 freely pivots to enable the user to move the device more freely and nimbly. The user's other hand is in the trigger of the rotary drill to control the speed of the saw blade. With two portions of the continuous loop saw blade exposed between the covers 478 and 480, the user selects which blade section to utilize in performing the cut on the work piece.

Figure 22:
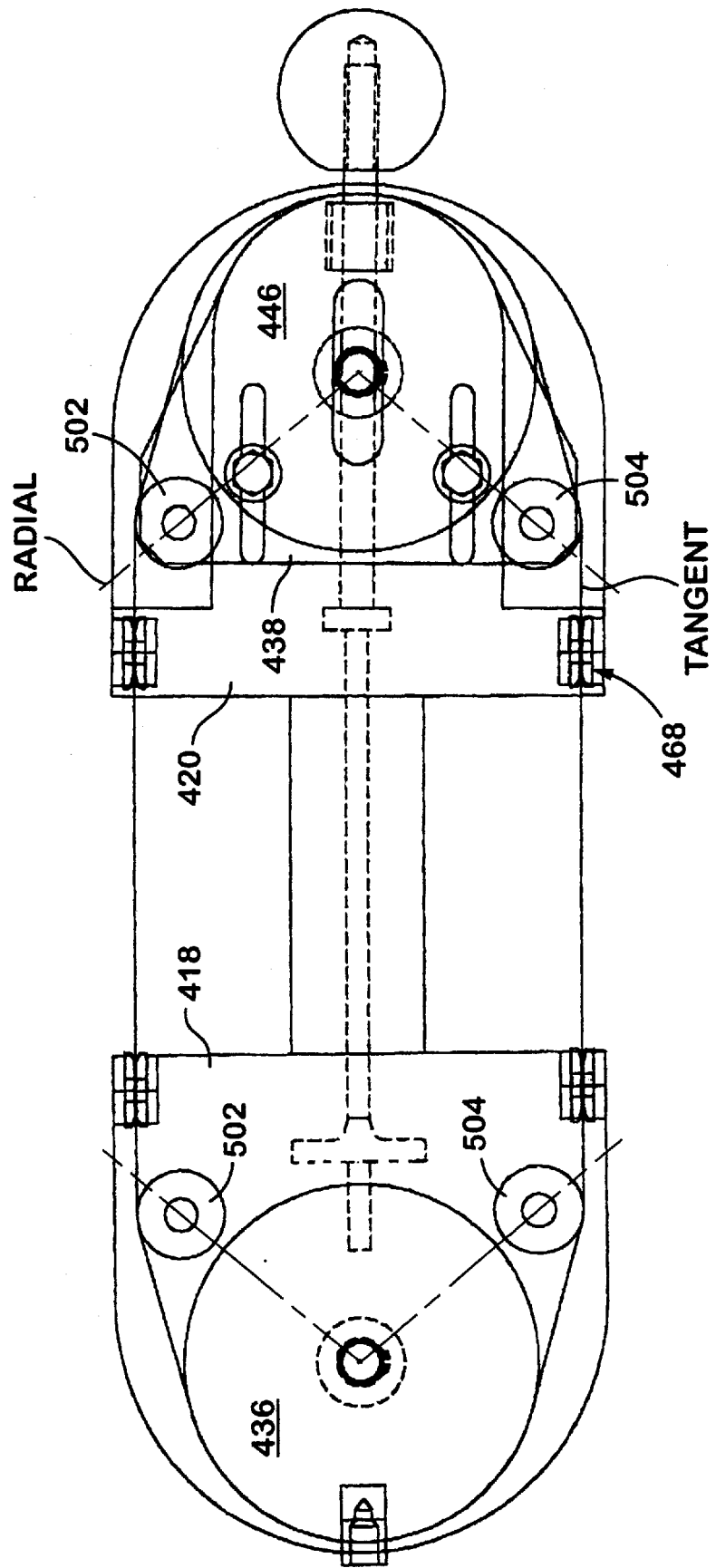
FIG. 22 is a schematic diagram of the instant invention having rollers intermediate each pulley and the guide rollers.

In each of the embodiments described above, the stress on the continuous loop blade around the drive and driven pulleys may be reduced significantly with the aid of additional rollers located between the guide rollers and the pulleys. FIG. 22 is a schematic diagram illustrating the placement of at least one idler roller adjacent each pulley on the saw. The instant figure illustrates two idler rollers proximate one pulley. It is contemplated that a similar arrangement may be implemented at the opposite end of the saw. Accordingly, this description will be limited just to one end. The drawing illustrates the two pulleys 436, 446 similar to those described above. Located radially from the axis of rotation of each pulley 436, 446 at two equal distances therefrom, yet on opposite sides of the lateral midline of the saw, are idler rollers 502 and 504. Each roller 502 and 504 preferably includes a rubber wheel or outer perimeter. The outer perimeter of the wheel may also be tangential to a line parallel to the rectangular channel portion 476 of the guide roller 468 as illustrated by the line 508. The height of the roller is approximately equal to that of the pulley 436, 446 and guide rollers 468. The purpose of the roller 502, 504 is to 1) increase the distance between the parallel blade segments or portions of the continuous loop blade, as well as 2) increase the angle at which the continuous loop blade spools on and off of the drive and driven pulley 436, 446. Each roller 502, 504 not only assists in reducing the angle of the continuous loop blade to and from the guide rollers, but it also assists in aligning the continuous loop blade with the channel in each drive and driven pulley. The rubber exterior to each roller 502, 504 also acts as a cushion, absorbing some of the stress and tension on the continuous blade during the cutting process, and thus increases the overall life of the continuous blade. In a preferred embodiment, each roller 502, 504 is to remain in fixed relationship with the adjacent drive or driven pulley 436, 446 such that the distance between the drive or driven pulley 436, 446 and each roller, as well as the radial angle, remains constant. For example, in the embodiment of the invention shown in FIG. 21, rollers 502, 504 are mounted to the mounting plate 420 such that upon adjustment of the plate, the rollers 502, 504 would move with the driven pulley 446. Similarly, at the drive pulley end of the saw, the rollers 502, 504 would be fixed on the plate 418 with respect to the pulley 436.

In still another embodiment of the invention, it is contemplated that it may be desirable to expose only a single section of the continuous loop blade, and increase the throat or work space. FIGS. 23 through 26 illustrate one embodiment 610 wherein the exterior housing 612 is generally elongate, having a first generally cylindrical end 614 configured to retain a motor as described in greater detail below, and provide a first grip for the operator. The upper end 616 includes a generally centrally disposed power switch 618 which may be a variable speed switch or a multi-position switch for controlling the speed of the motor. The opposite end of the cylindrical portion 614 of the housing 612 tapers outwardly into an enlarged detachable housing cover 620 concealing the two pulleys described above. Cover 620 as well as a portion of the cylindrical portion 614 of the housing 112 may contain vent holes 622 to expel debris produced by the cutting of the kerf in the work piece. The vent holes may also provide discharge ports for heated air used in the cooling of the motor.

Extending generally tangentially from the cylindrical end 614, and extending along length of the housing 112, is a generally tubular or elongate portion 624. The elongate portion 624 is laterally offset to one side of the saw from the mid line interconnecting the two pulleys, where it joins with an opposite end of the housing 626 generally enclosing the opposing pulley (driven pulley) at the opposite end 626 of the housing. Defined on the side of the housing opposite that of the elongate portion 624 is a gap 628 which expands toward the interior of the work space or arch 630. The elongate portion 624 forming one side of the saw acts as a bridge between the two pulleys. Attached to the end 626 of the housing is a handle 632 mounted on a generally ball shaped member extending from the housing 612. The connection permits the handle to swivel about its longitudinal access as well as to tilt in a wide variety of directions.

Referring to FIGS. 24–26, the lower portion of housing includes a single piece housing cover which encloses the pulley at end 626, extends along the bottom of the elongate portion 624 and covers a pulley at the cylindrical end 614, thus serving to enclose approximately three-fourths of the continuous loop blade, including the portion of the blade segment parallel to that extending across the gap 628. Pinch rollers similar to those described above, including guide roller assemblies 460 and pinch roller sets 240, 242 may be disposed within the housing, on opposite sides of the gap to provide lateral and vertical strength to the continuous loop blade. Likewise, idler rollers such as 502, 504 may be positioned adjacent each drive pulley and driven pulley to assist in guiding the continuous loop blade about the circuit and absorb any tensional variations produced as a result of the saw's use. Other than the lateral offset of the elongate portion, the components of the saw and its operation work generally in accordance with the embodiments described above.

Just as with conventional saws, including circular saws, the dimensions of the instant invention may vary depending upon the particular application needed. For example, it is contemplated that a smaller version of the invention, having a gap on the order of several inches wide, it may be used for small projects. On the other hand, a larger embodiment, wherein the gap may be on the order of 12 inches may be designed for substantially larger projects. The particular application of the saw depends in substantial part upon the depth and height of the work space traversed by the continuous loop blade. Furthermore, although a continuous loop saw blade is described, it is understood and anticipated that two independent saw blade segments may be spaced from each other, and connected at opposite ends to reciprocating rotary actuators which produce a back-and-forth action in the saw blades to create the cutting action. In addition, it is further understood that the guide rollers, back-up bearings, and the idler rollers may be incorporated in any one of a number of configurations on different forms of the invention to achieve a desired result. The description with respect to the specific embodiments mentioned above should not be considered limiting as to the combination of components to complete the invention.

In each of the embodiments described above, it is considered there may be instances where the blade may be pulled off the pulleys when the saw is backed out of a kerf. In order to reduce the chances of this occurring, back-out bearings such as 710 shown in FIG. 27 may be incorporated in any one or more of the above-described assemblies.

It is envisioned that four bearings 710 would be mounted so as to be positioned on the cutting side 712 of the blade 714, one each just outboard of the guide rollers assemblies/ sets such as 716. In operation, the back-out bearings 710 are intended to engage the continuous loop blade 714 only when the section of the blade is withdrawn from the kerf of the cut, or when a substantial amount of cutting pressure is applied so as to cause the section of the continuous loop blade 714 to bow as a result of the lever action on the guide roller assemblies 716.

In one form of the back-out bearings, each may include a radial/thrust-load track roller having a conventional metal bearing 718 journaled about a stud 720. The circumference of the metal bearing is preferably coated with a synthetic polymeric material 722 which is permanently molded or formed thereon to produce a somewhat resilient, non-sparking surface. An example of one type of roller illustrating this type of construction is available from McMaster-Carr and is referenced to as a composite radial-load track roller.

For purposes of convenience and freeing the blade when replacement is necessary, the mounting bracket for each bearing is attached to the removable cover 814, 820 (FIG. 29) such that mounting of the cover properly spaces the bearings from the continuous blade. For example as it is contemplated that each cover is formed by injection molding. Brackets may be formed as an integral part of each cover to support the four bearings, either by studs or axles. Numerous other mounting methods may be devised to locate the bearings adjacent the blade to prevent sufficient flexing to force the blade from the tracks on the drive and driver pulleys.

Yet another embodiment 800 of the invention is shown in FIGS. 28–33. In this embodiment, a housing 802 provides the frame assembly and is preferably formed from high impact polymeric materials using conventional plastic injection molding techniques. Internal structures such as bulkheads, flanges, braces and the like are formed internally to the housing to accommodate various components and to provide a strong framework for the other components. Housing 802 includes a first end 804 having an upright portion 806 providing a chamber for retaining a motor described below. The upper end 808 of the motor housing 806 includes a plurality of vents 810 for providing cooling. As better illustrated in FIGS. 28, 30 and 31, end 804 includes a generally oblate spheroid lower portion 812 having a substantially planar bottom surface 814 which is configured to house the drive pulley assembly. The upper portion of the oblate spheroid portion is integral with the motor housing 806. The lower half 812A is formed as a separate element, attached to the upper portion in a variety of ways including fasteners or snap fit arrangements.

The opposite end 816 of the housing 802 also includes a substantially oblate spheroid portion 818 having a substantially planar lower surface 820 and is configured to house the drive pulley assembly described below. As with the opposite end 804, oblate spheroid portion 818 includes an upper portion which is formed integrally with bridge 822 described below. A lower portion 818A is formed as a separate component and attached to the upper portion by either a snap fit arrangement or with the aid of fasteners. Ends 804 and 816 are interconnected by an intermediate or bridge portion 822 which is substantially symmetrically located with respect to the two ends, and is elevated relative to the two ends to define an intermediate gap, space or work area 824 across which the blades of the saw traverse. End 816 of the housing also includes a handle 826 extending from a surface opposite that connected to the bridge 822 and along an axis generally parallel to that of the saw body. Handle 826 is preferably mounted with respect to end 816 such that it is permitted to swivel about a longitudinal axis of the saw, as well as pivot a limited amount in a number of directions generally orthogonal to the longitudinal axis to provide the operator greater flexibility in manipulating the saw during use. In the preferred embodiment, the electrical switch or trigger 828 is housed in the handle 826 to energize the saw. A conventional switch lock 830 may also be included so the operator can fix the trigger position during operation. Other power aspects of the coping saw 800 include the location of a two-way switch 830 mounted in the housing, and in the preferred embodiment, on the upper surface of the bridge 822. The switch 830 is provided to reverse the direction of the enclosed motor during operation. Also coupled to the bridge portion at a point proximate the second end 816 of the housing 802 is an electrical cord which provides A/C power to the electrical components within the housing. Although an electrical cord is shown, it is contemplated that D/C power may be substituted by adapting the bridge to accommodate one or more battery packs. Alternatively, as briefly mentioned above, the electrical components and motor may be substituted by a compressed air system.

Referring to FIGS. 29–31, guide roller assemblies 834 are disposed on each of the oblate spheroid portions 812 and 818 adjacent the work space 824. Each guide roller assembly 834 is positioned immediately adjacent an opening in the housing where the portions of the continuous loop saw blade exits or enters the housing 802 and spans the work space 824. The purpose of the guide roller assemblies is to provide support to the saw blade across the work space 824 as discussed above with respect to the other embodiments. Each of the guide roller assemblies 834 includes a guide roller 836 mounted on a bearing and pin (not shown in detail) supported by an arm extending slightly from the oblate spheroid portion above each blade section entrance or exit. Each guide roller includes a circumferential groove, channel or track of substantial depth to receive the saw blade. The channel in each guide roller not only provides lateral stability to the saw blade, but also supports the blade when pressure is applied during the cutting process. That is to say the guide roller 836 provides support to the back of the saw blade in a first direction during operation and provides stability along an orthogonal axis to keep the saw blade from wavering or wandering within the work space 824. The height of each guide roller 836 is preferably adjustable to account for saw blades of different heights used for different applications. In one of the alternate embodiment described above, the guide rollers 836 may provide support in only a single direction. Pincher bearings may be provided on opposite sides of the saw blade to provide the lateral stability. It is contemplated that if pincher rollers are provided, the distance between them would also preferably be adjustable by way of screws, thumb screws, knobs or other adjustment mechanism located on the exterior of the housing. Other mechanisms may also be provided to permit the operator to make such an adjustment to accommodate the saw bearing.

Generally opposite each of the guide rollers 836 and disposed slightly toward the ends of the housing 802 are anti-backout bearings 838. Each anti-backout bearing 838 is mounted by a spindle or other form of axle to the pulley cover 812A and 818A, also referred to as the lower portion of the oblate portion 812 and 818 respectively. Each of the anti-backout bearings includes a polymeric rim or outer portion intended to engage the toothed-portion of the saw blade when the saw blade is being withdrawn from a kerf. The anti-backout bearings may also engage the saw blade when sufficient pressure is applied during the cutting process to cause the saw blade to bow during the cutting process. The purpose of the anti-backout bearing is too ensure the saw blade rides on the drive and driven pulleys.

Figure 32:
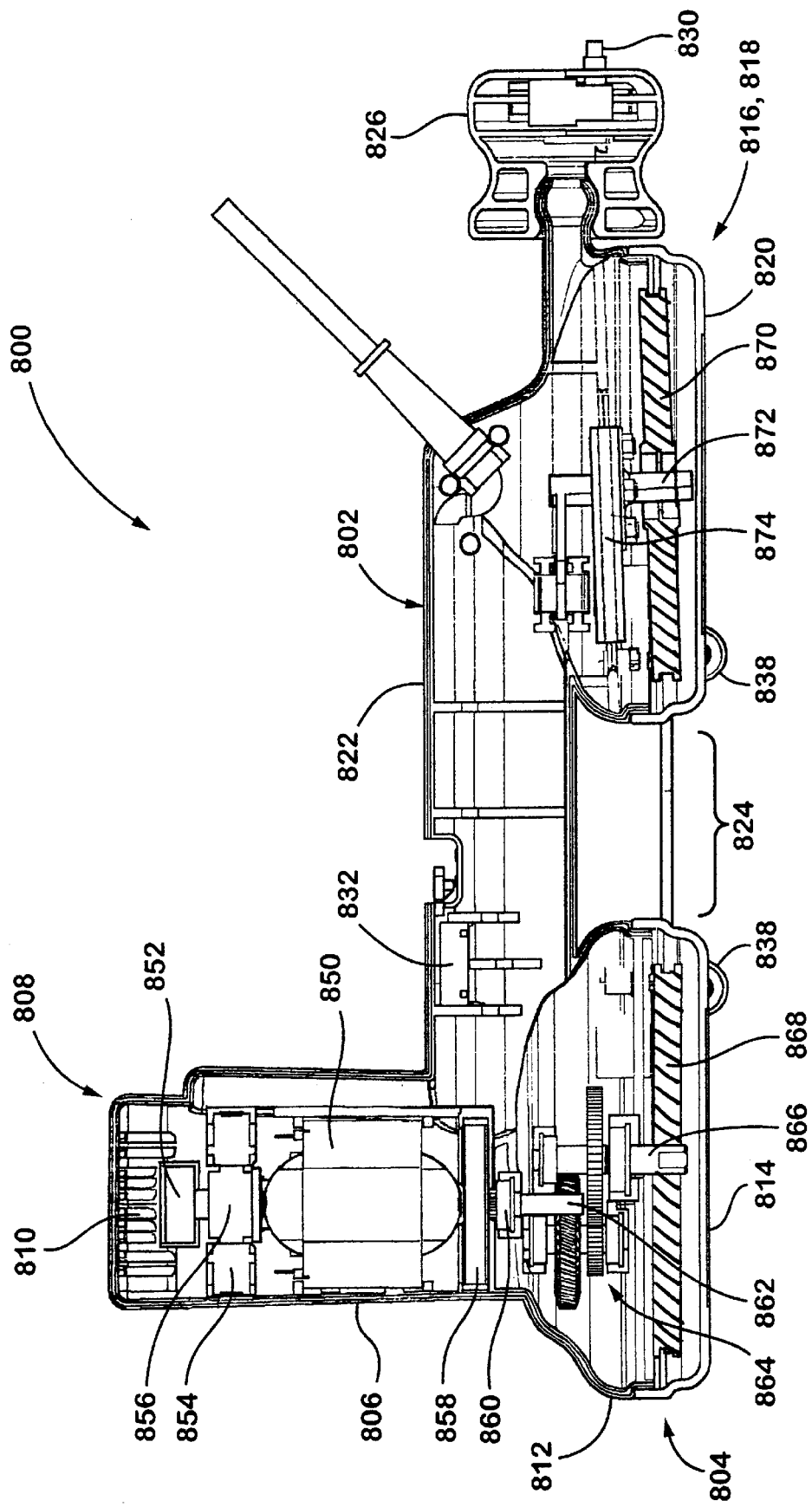
FIG. 32 is a vertical section view of the invention shown in FIG. 31 taken along line XXXII—XXXII.
Figure 33:
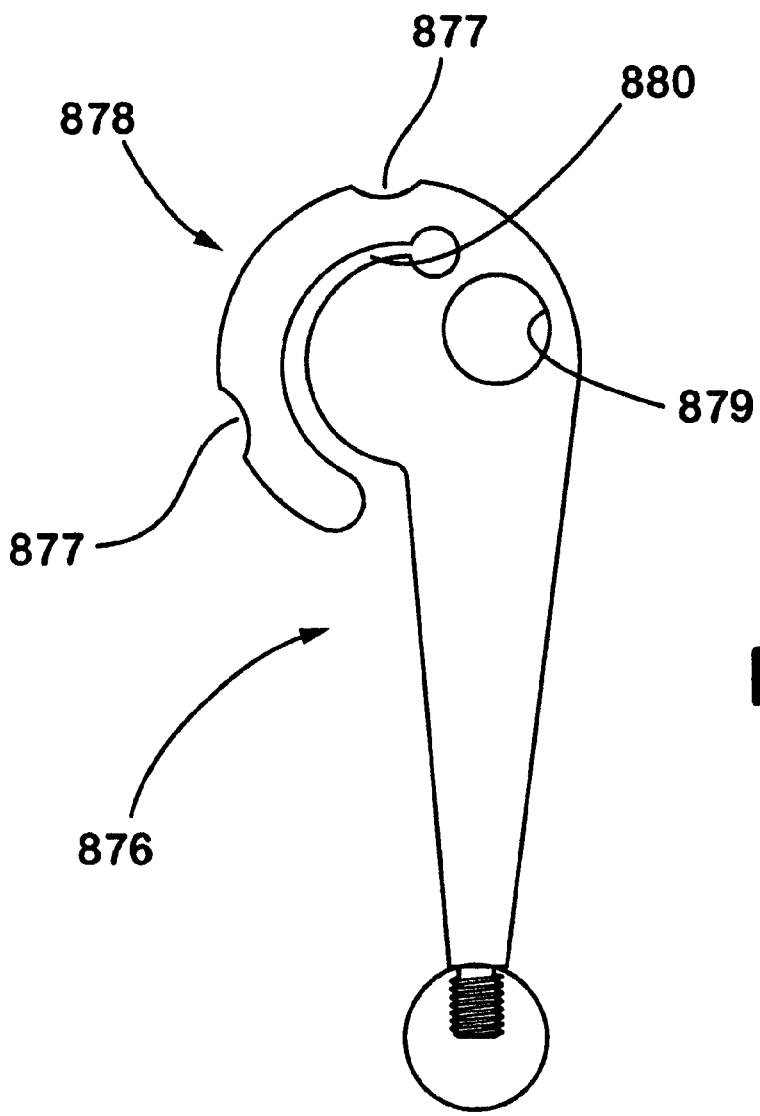
FIG. 33 is a plan view of a lever mechanism for adjusting tension on the saw blade.

The internal components of the invention are better shown in FIGS. 32 and 33. It is contemplated that housing 802 may be include four parts. The bridge and the upper portions of the pulley housings (upper oblate spheroid portions) as well as the motor housing may be formed by two halves, divided longitudinally along a vertical center line. Looking at the left hand portion of the figure, a motor 850 is shown mounted within the motor housing 806. Appropriate bulkheads and recesses are molded into the internal portion of the housing 802 to accommodate an upper bearing 852, brushes 854, and the stator 856. Disposed below the stator is a fan 858 for drawing cooling air down from the top 808 of the motor housing 806, across the motor 850, and out through vent holes provided in the housing. Below the fan 858 is a second bearing 860 supporting the lower end of the motor shaft 862. The lower end of the shaft 862 is interconnected by one or more gears 864 to a spindle 866 which in turn is attached to the drive pulley 868 located in end 804 of the housing. The details of the drive pulley will not be described in any further detail herein for the reader is referred to the description provided above.

Figure 34:
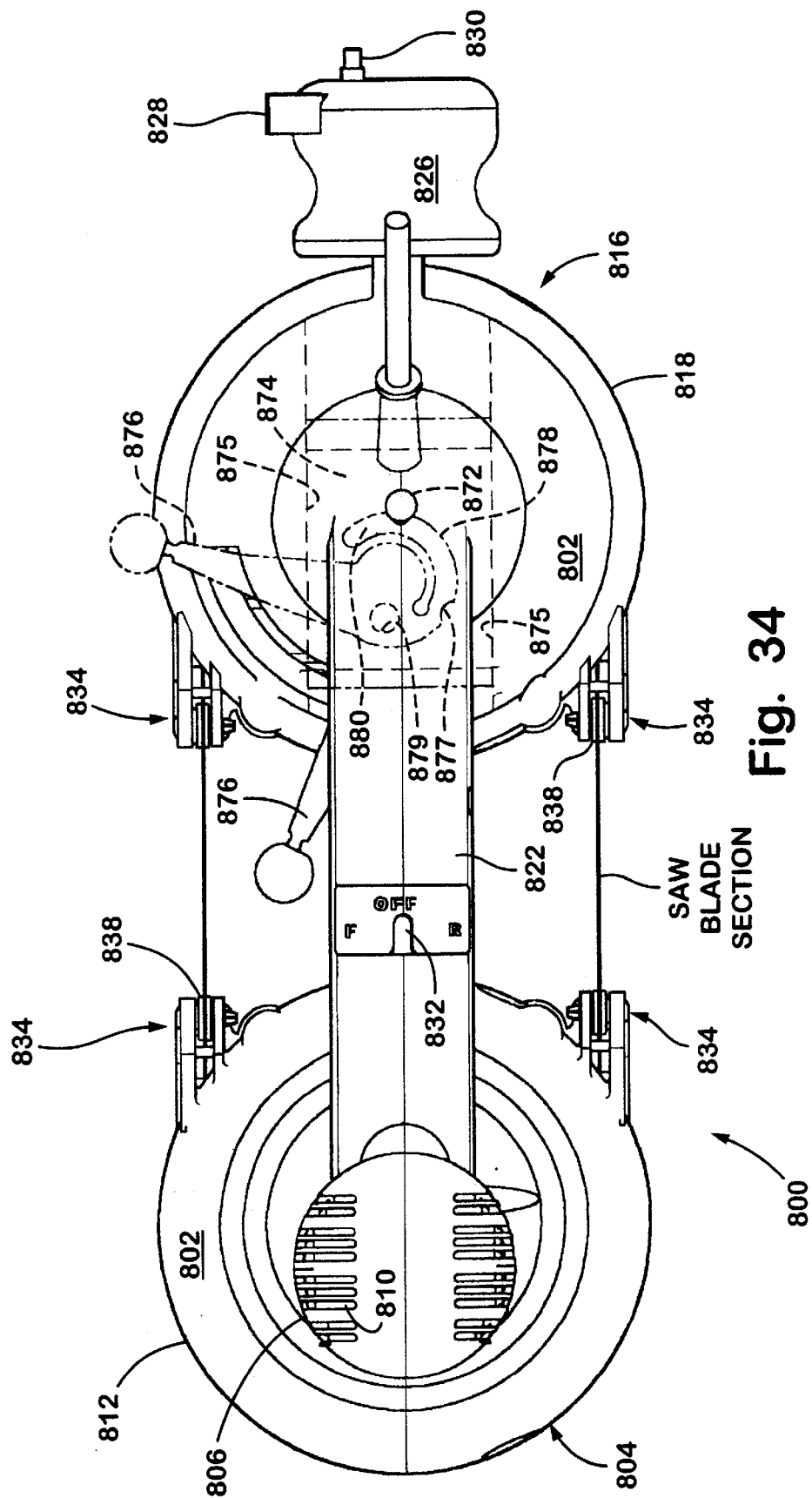
FIG. 34 is a bottom section view of the invention shown in FIG. 31 taken along line XXXIV—XXXIV.

Mounted in the opposite end 816 of the housing is the driven pulley 870. The driven pulley 870 is mounted to a spindle 872 which in turn is mounted to a carriage 874 to allow translation of the driven pulley along a longitudinal axis of the saw. In this embodiment, the driven pulley 870 is slightly inclined with respect to the drive pulley 868 in order to help retain the continuous loop saw blade thereon. The carriage 874 may be a platform through which the spindle 872 is mounted, supported by the appropriate bearings to ensure smooth operation. Opposing sides of the carriage 874 are in contact with the two halves of the housing 802 and configured to slide within channels 875 defined in the interior wall of each housing half. A lever 876 (shown in FIGS. 33 and 34) is mounted to the carriage 874 which includes an eccentric lobe 878 having an arcuate slot 880. On the external perimeter of the eccentric lobe, at least two detents 877 are formed for reasons which will become apparent below. The eccentric lobe 878 of the lever is adapted to swing about a 90 degree arc around a pin extending through hole 879 wherein the perimeter of the lobe engages a pin (not shown) on the carriage. The detents 877 on the perimeter of the lever lobe 878 temporarily hold the lever at the respective position as a result of the spring action afforded by the arcuate slot 880 in the lever. As the lever is rotated, the eccentric lobe 878 engaging the carriage 874 causes the carriage 874 to translate along the channels 875 in the housing 802. In this fashion, the distance between the driven pulley 870 and the drive pulley 868 is changed to permit the continuous loop saw blade to be placed in tension on the pulleys, or to be removed from the pulleys.

In operation, and after connecting the coping saw 800 to the appropriate power source (i.e., electrical, d/c, or pneumatic), the operator grasps the coping saw 800 by placing one hand around the motor housing and the other hand on the handle 826. The operator depresses switch 828 to power the coping saw and turning the continuous loop saw blade about the drive and driven pulleys, 868 and 870, respectively. The pivoting and tilting handle 826 permits the operator to place the coping saw in a wide range of positions to make the desired cut. The handle 826 includes built-in stops to prevent the user from breaking the electrical connection with the trigger mounted in the handle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

1. A method for cutting a work piece using a coping saw having a continuous loop blade supported by at least two spaced apart pulleys and providing two parallel cutting-blade sections, and a pivoting, swiveling handle disposed at one end of the coping saw, comprising the steps of:

selecting a rotation direction for the continuous loop blade;

grasping the coping saw with at least one hand positioned on the pivoting, swiveling handle located at the end of the coping saw;

providing power to the coping saw to cause the continuous loop blade to rotate in the desired direction;

engaging the work piece with at least one of the two parallel cutting blade sections; and pivoting and turning the coping saw about the pivoting, swiveling handle disposed at the end of the coping saw to cause one of the two parallel cutting blade sections to cut the work piece along a predetermined path.

2. A method for cutting a work piece with a coping saw having a continuous loop blade forming two exposed cutting blade sections, and a swiveling handle disposed at one end of the coping saw, comprising the steps of:

grasping the coping saw with one band on the swiveling handle disposed at the end of the coping saw;

causing the continuous loop blade to rotate in a selected one of two opposing directions by supplying electrical current to the coping saw;

engaging the work piece with one of the two exposed cutting blade sections to cut the work piece; and controlling the cutting direction of the cutting blade along a predetermined, path by pivoting the coping saw relative to the swiveling handle.

3. The method as defined in claim 2, further including the step of varying a speed of the continuous loop blade.

4. The method as defined in claim 3, wherein the step of varying the speed of the continuous loop blade comprises varying a position of a switch used to provide electrical current to the coping saw.

5. The method as defined in claim 2, further comprising the step of providing at least one roller adjacent said continuous loop blade to restrict movement of said continuous loop blade in any direction normal to a longitudinal axis of said continuous loop blade.

6. A method for operating a coping saw having a pivoting handle at one end, and a continuous loop blade defining two exposed and parallel cutting blade sections to cut a work piece, comprising the steps of:

grasping the coping saw with at least one hand grasping the pivoting handle disposed at the one end of the coping saw;

causing the continuous loop blade to move in one of two directions at a speed selected by the operator;

engaging the work piece with at least one of the two parallel cutting blade sections; and controlling a cutting path of said one of the two parallel cutting blade sections by swiveling the coping saw about an axis extending through the pivoting handle.

* * * * *